(12) United States Patent
Ishige et al.

(10) Patent No.: US 10,955,734 B2
(45) Date of Patent: Mar. 23, 2021

(54) LIGHT SOURCE APPARATUS AND PROJECTION DISPLAY APPARATUS

(71) Applicant: Sony Corporation, Tokyo (JP)

(72) Inventors: Masahiro Ishige, Kanagawa (JP);
Izushi Kobayashi, Tokyo (JP);
Takeharu Takasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/468,809

(22) PCT Filed: Nov. 10, 2017

(86) PCT No.: PCT/JP2017/040570
§ 371 (c)(1),
(2) Date: Jun. 12, 2019

(87) PCT Pub. No.: WO2018/116689
PCT Pub. Date: Jun. 28, 2018

(65) Prior Publication Data
US 2019/0369469 A1    Dec. 5, 2019

(30) Foreign Application Priority Data
Dec. 19, 2016    (JP) .............................. JP2016-245705

(51) Int. Cl.
*G03B 21/16*    (2006.01)
*H04N 9/31*    (2006.01)
(Continued)

(52) U.S. Cl.
CPC ........... *G03B 21/20* (2013.01); *G03B 21/145* (2013.01); *G03B 21/16* (2013.01); *H04N 9/3144* (2013.01)

(58) Field of Classification Search
CPC .... G03B 21/16; G03B 21/204; H04N 9/3144; F21V 29/50; F21V 29/51; F21V 29/56; F21V 29/60
(Continued)

(56) References Cited

U.S. PATENT DOCUMENTS

2015/0076359 A1    3/2015    Bykanov et al.
2016/0161736 A1    6/2016    Chou et al.
(Continued)

FOREIGN PATENT DOCUMENTS

CN    105849495 A    8/2016
CN    106200222 A    12/2016
(Continued)

OTHER PUBLICATIONS

The Engineering Tool Box, printed Aug. 12, 2020 (Year: 2020).*
(Continued)

*Primary Examiner* — Ryan D Howard
(74) *Attorney, Agent, or Firm* — Wolf, Greenfield & Sacks, P.C.

(57) ABSTRACT

A light source apparatus according to an embodiment of the present disclosure includes: a rotator including a light emission unit on one surface, a heat dissipation member that is coupled to the rotator, and has a first cylindrical surface substantially parallel to a rotation axis of the rotator, and a housing that contains the rotator and the heat dissipation member, and has a second cylindrical surface substantially parallel to the first cylindrical surface of the heat dissipation member.

11 Claims, 12 Drawing Sheets

(51) Int. Cl.
*G03B 21/20* (2006.01)
*G03B 21/14* (2006.01)

(58) Field of Classification Search
USPC .......................................................... 353/84
See application file for complete search history.

(56) References Cited

U.S. PATENT DOCUMENTS

2016/0178289 A1\* 6/2016 Gonzalez ................. G06F 1/20
 165/80.3
2017/0261844 A1\* 9/2017 Kitade ................... G03B 21/16
2017/0293211 A1 10/2017 Kobayashi et al.

FOREIGN PATENT DOCUMENTS

| EP | 3043200 A1 | 7/2016 |
| JP | 2012-013897 A | 1/2012 |
| JP | 2016-110985 A | 6/2016 |
| JP | 2016-528743 A | 9/2016 |
| JP | 2016-531316 A | 10/2016 |
| WO | WO 2015/013185 A1 | 1/2015 |
| WO | WO 2015/027004 A1 | 2/2015 |
| WO | WO 2016/056285 A1 | 4/2016 |

OTHER PUBLICATIONS

International Search Report and English translation thereof dated Feb. 6, 2018 in connection with International Application No. PCT/JP2017/040570.

Written Opinion and English translation thereof dated Feb. 6, 2018 in connection with International Application No. PCT/JP2017/040570.

International Preliminary Report on Patentability and English translation thereof dated Jul. 4, 2019 in connection with International Application No. PCT/JP2017/040570.

Chinese Office Action dated Apr. 2, 2020 in connection with Chinese Application No. 2017800769114 and English translation thereof.

\* cited by examiner

[ FIG. 1 ]
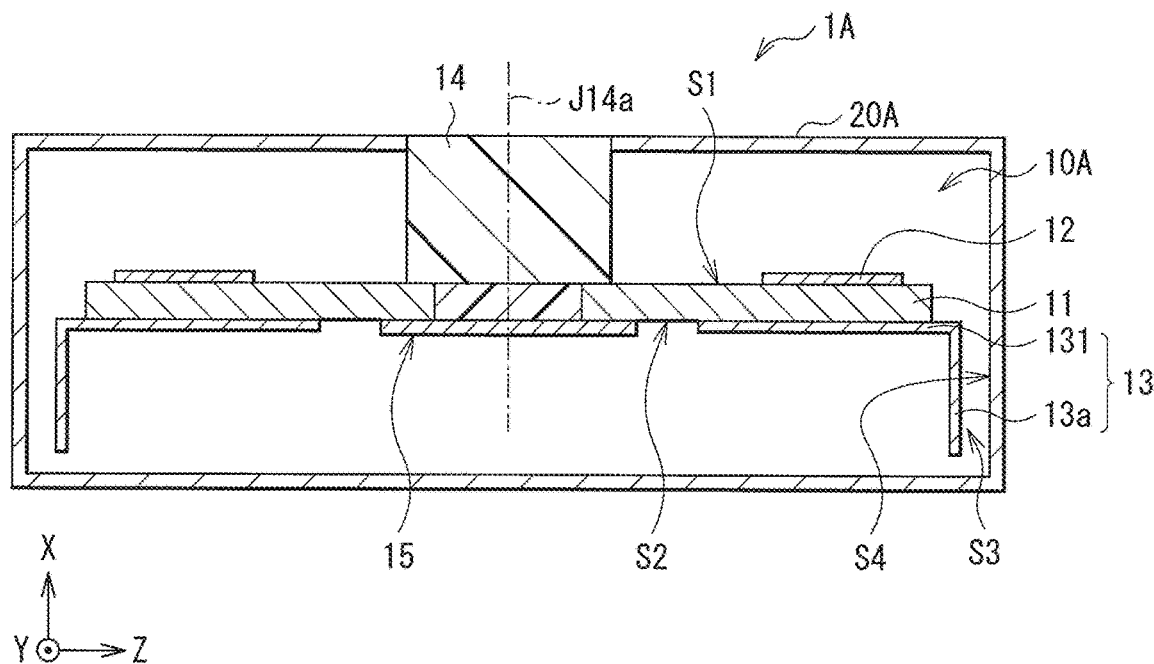
[ FIG. 2 ]
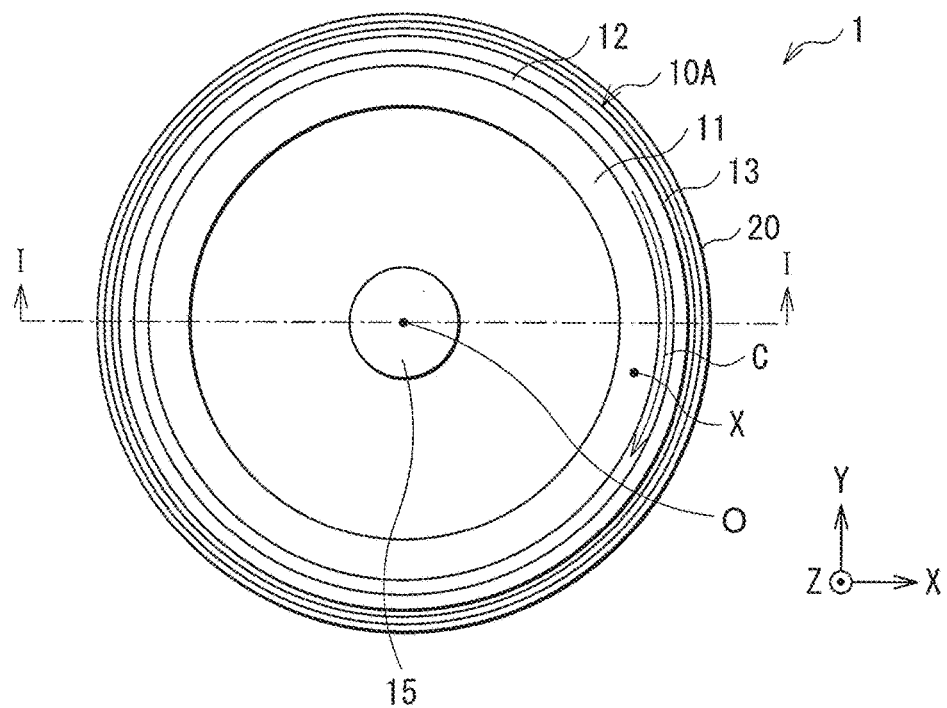

[FIG. 3]
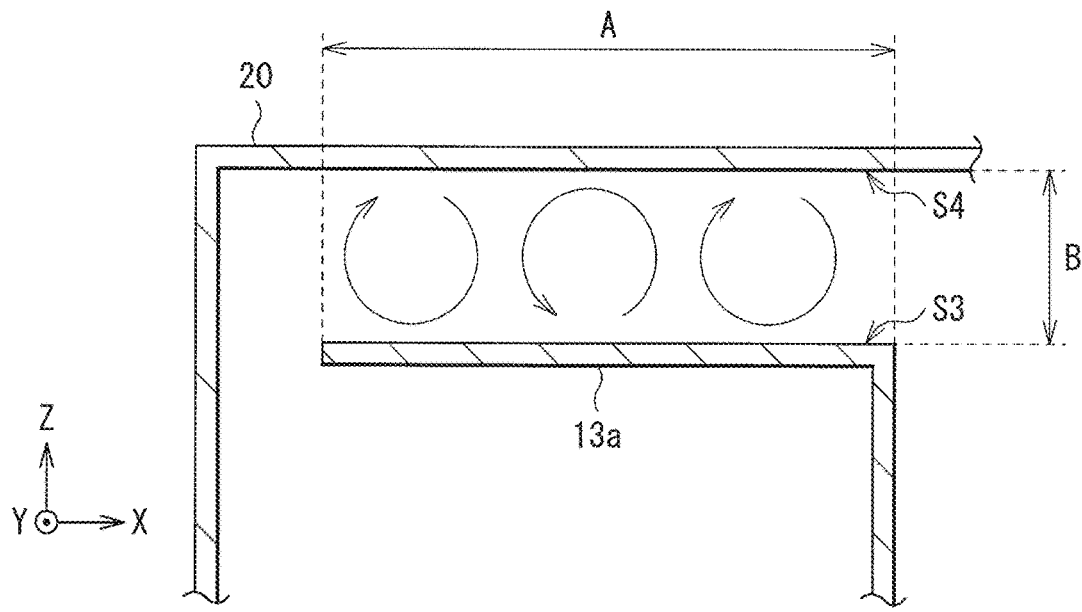
[FIG. 4A]
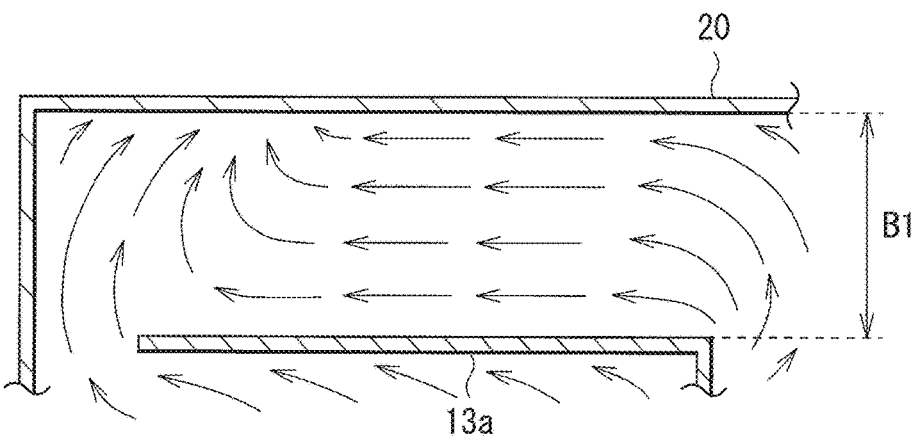
[FIG. 4B]
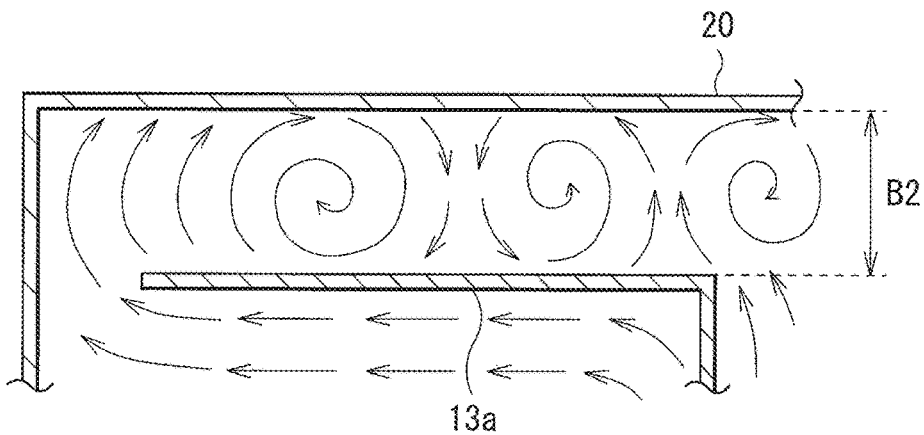

[ FIG. 4C ]
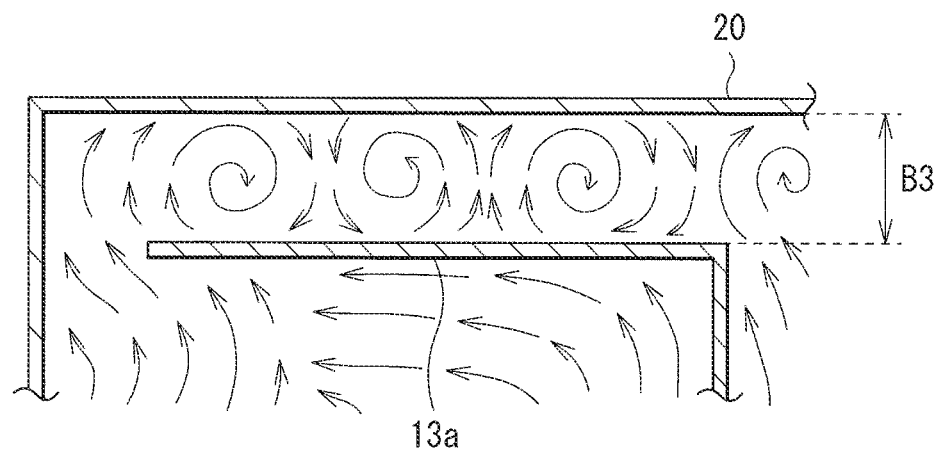
[ FIG. 4D ]
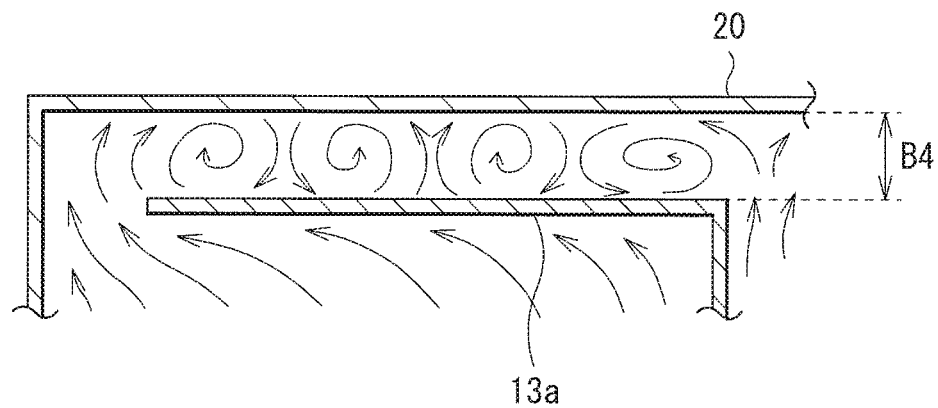

[ FIG. 5 ]
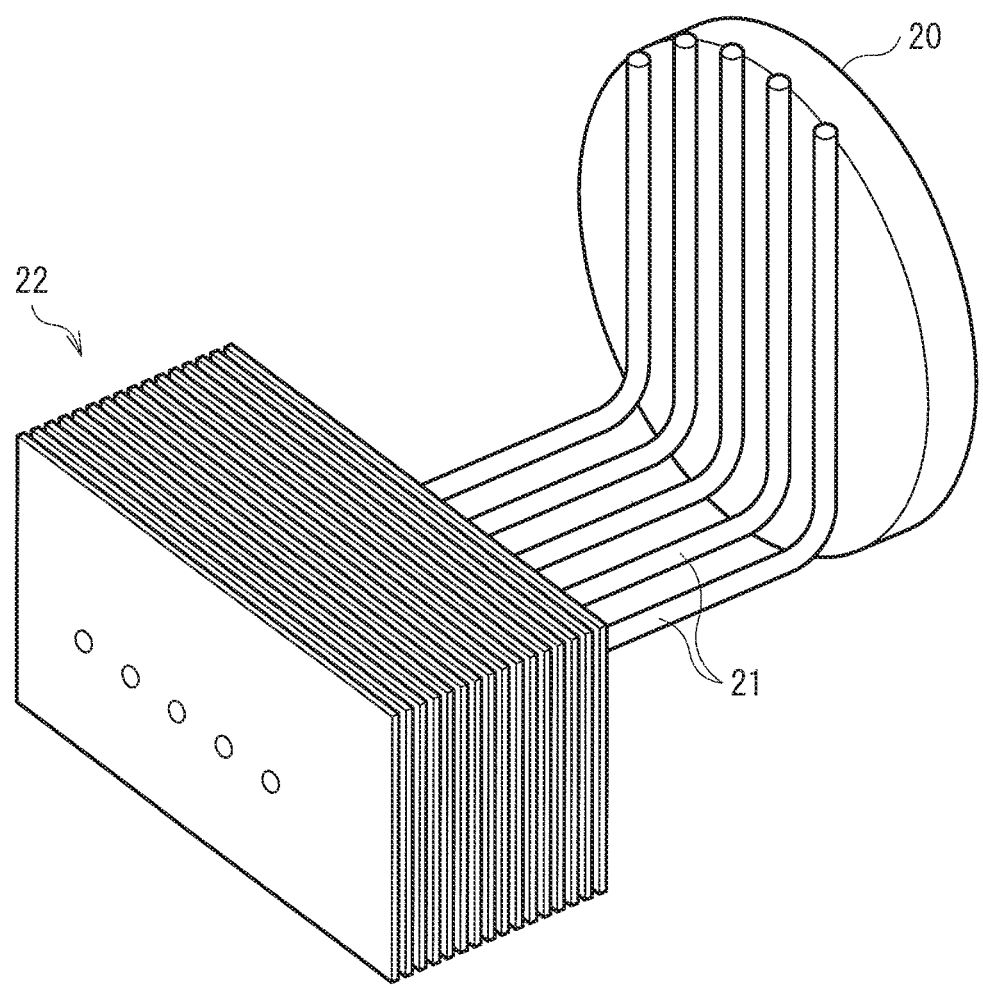

[ FIG. 6 ]
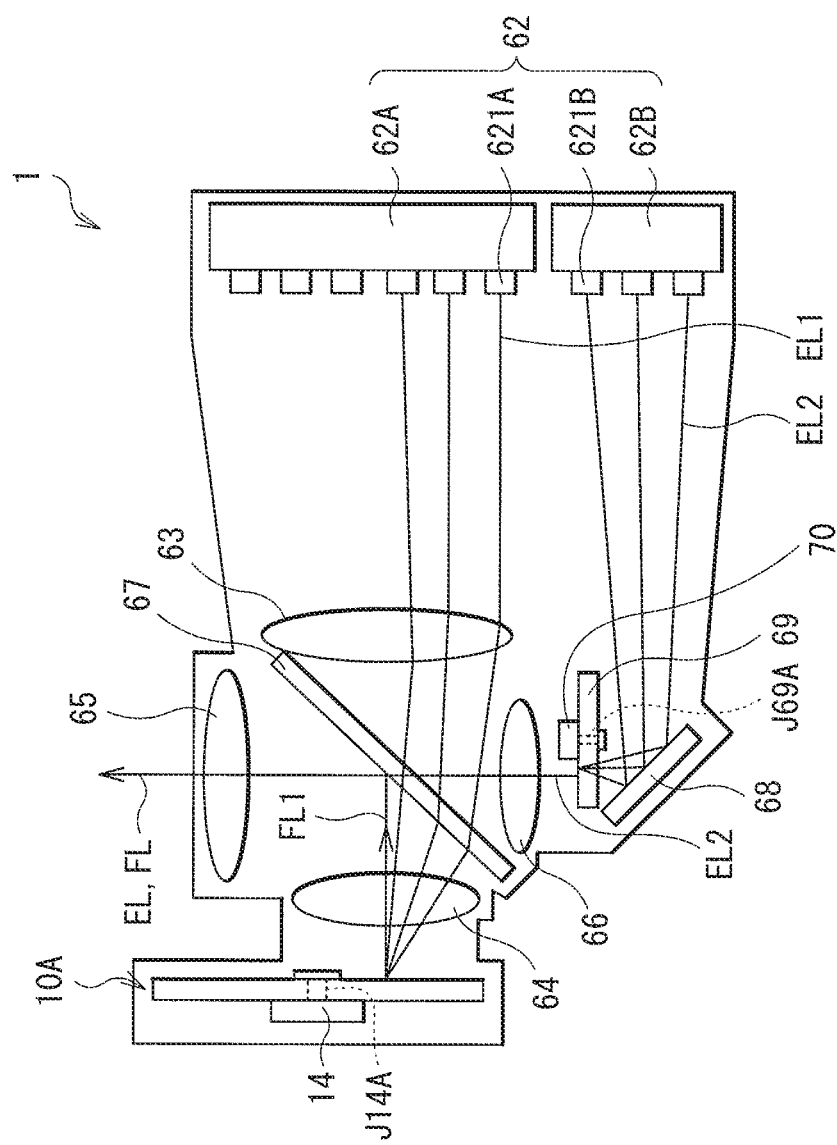

[ FIG. 7 ]
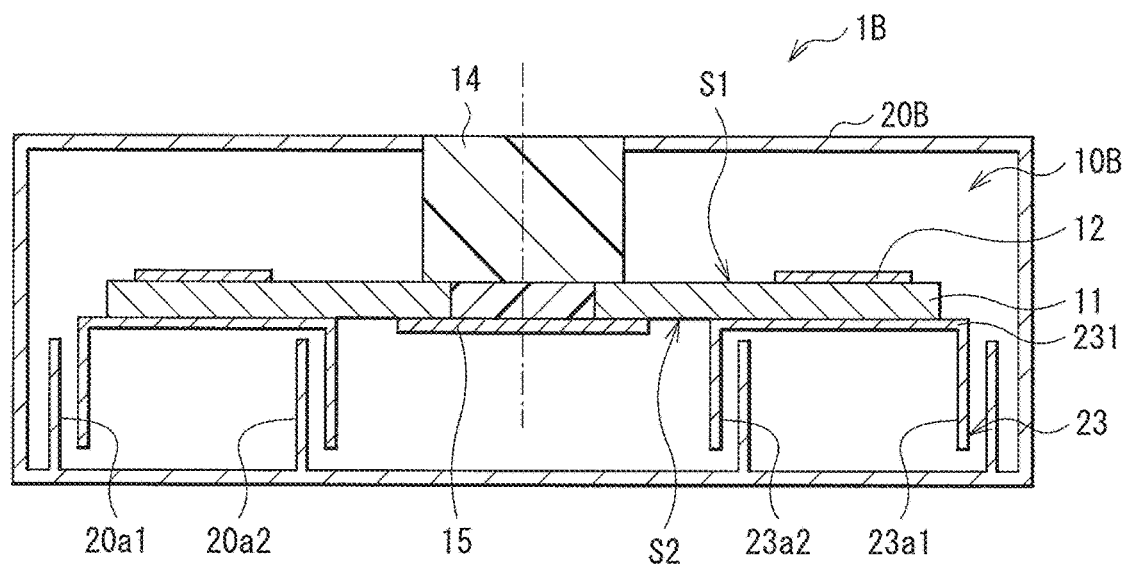
[ FIG. 8 ]
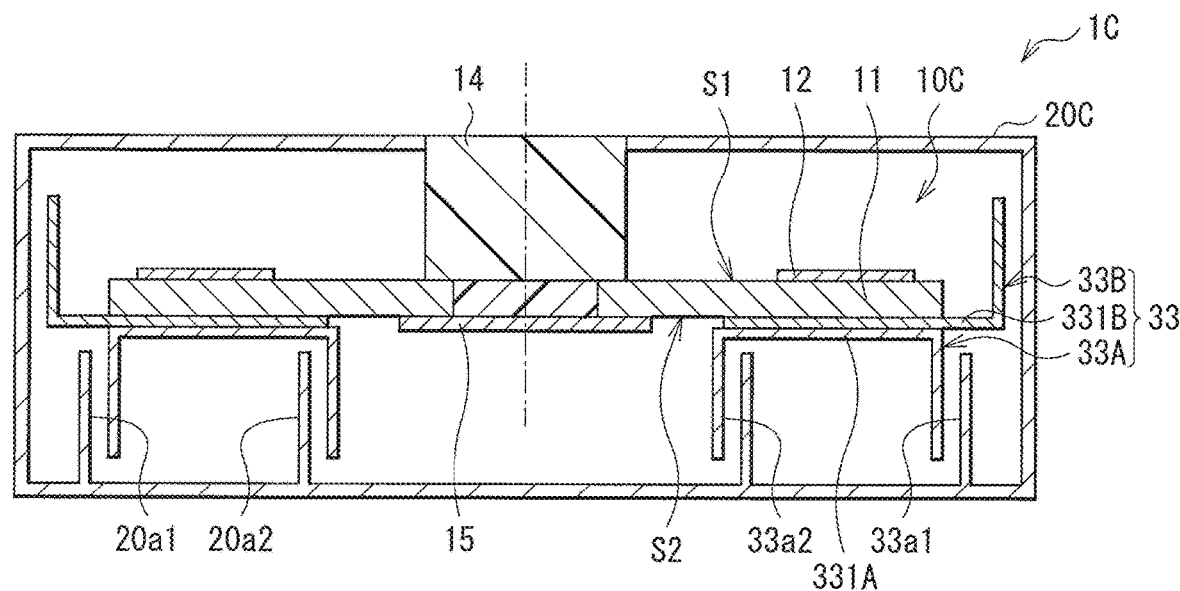

[FIG. 9]
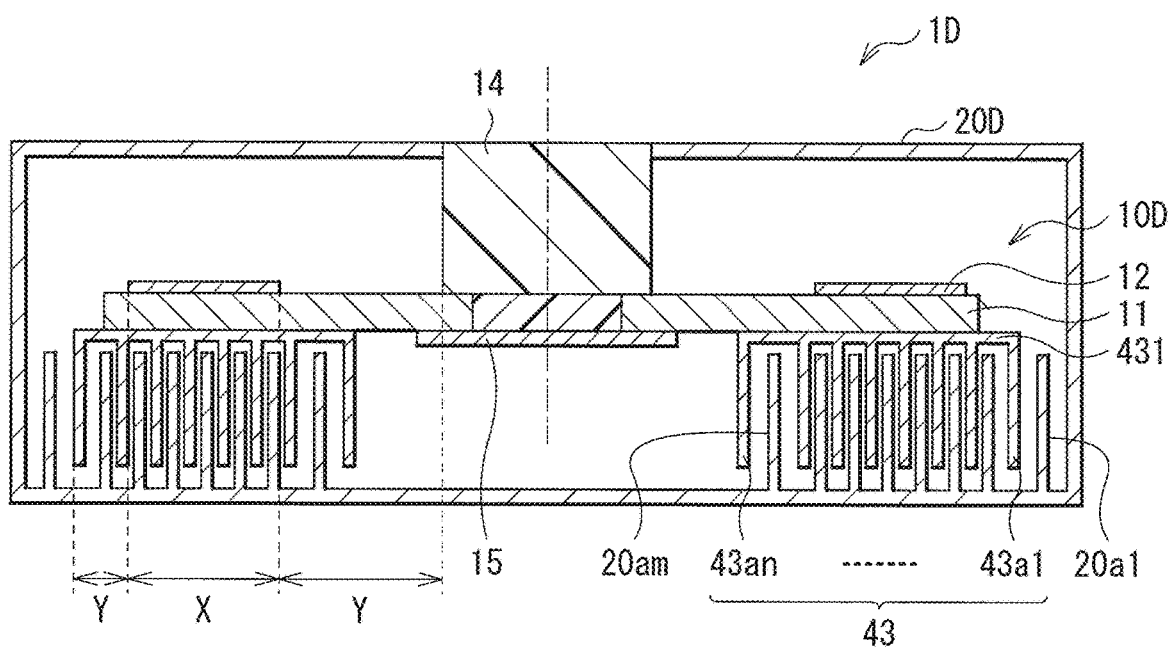

[ FIG. 10 ]
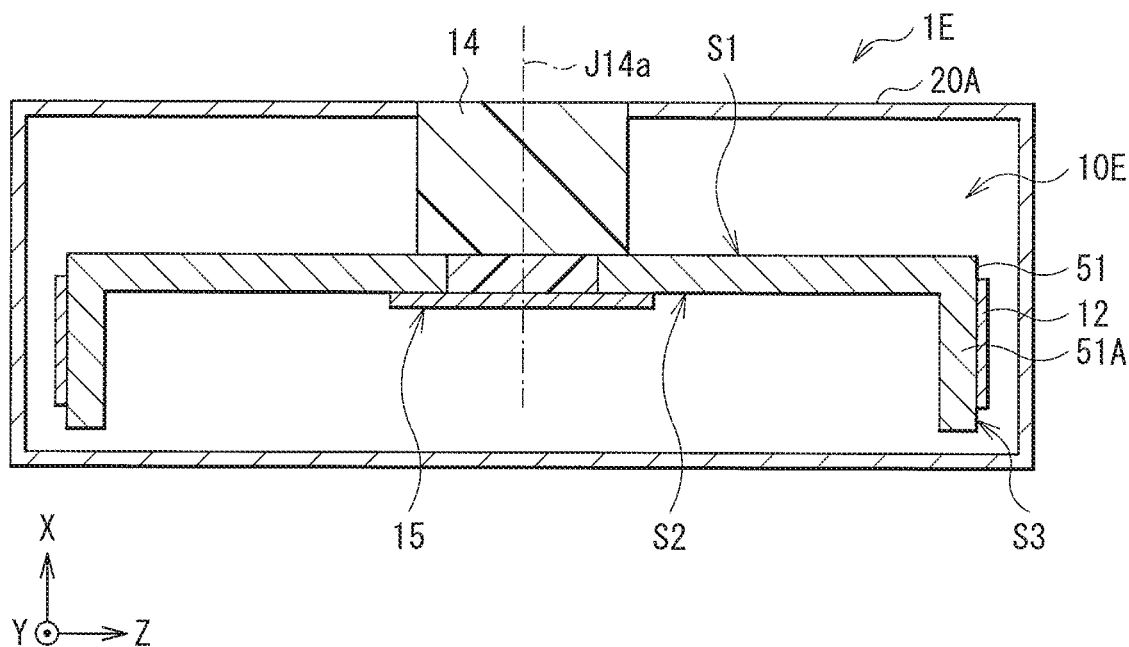
[ FIG. 11 ]
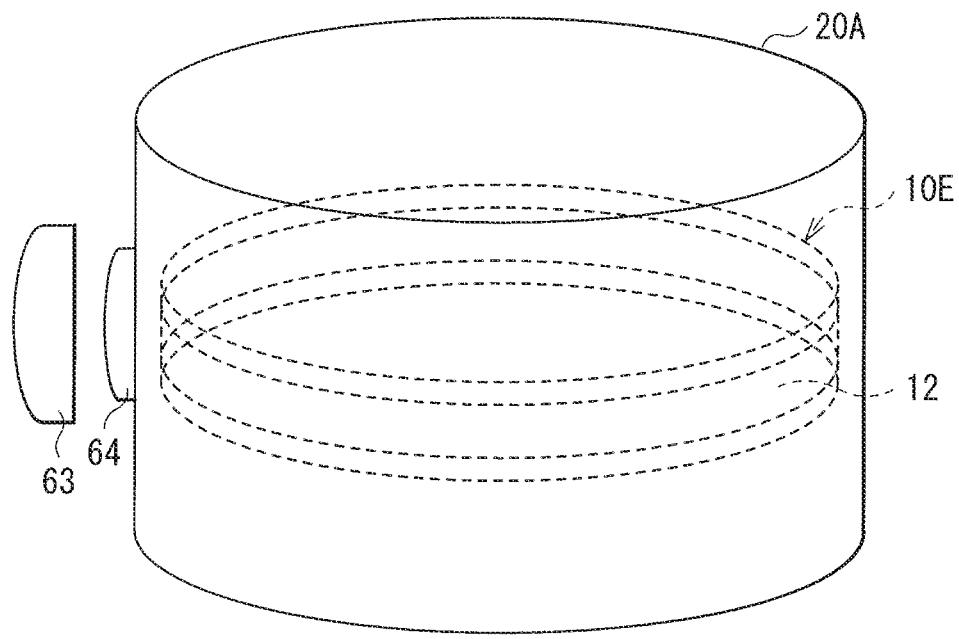

[FIG. 12]
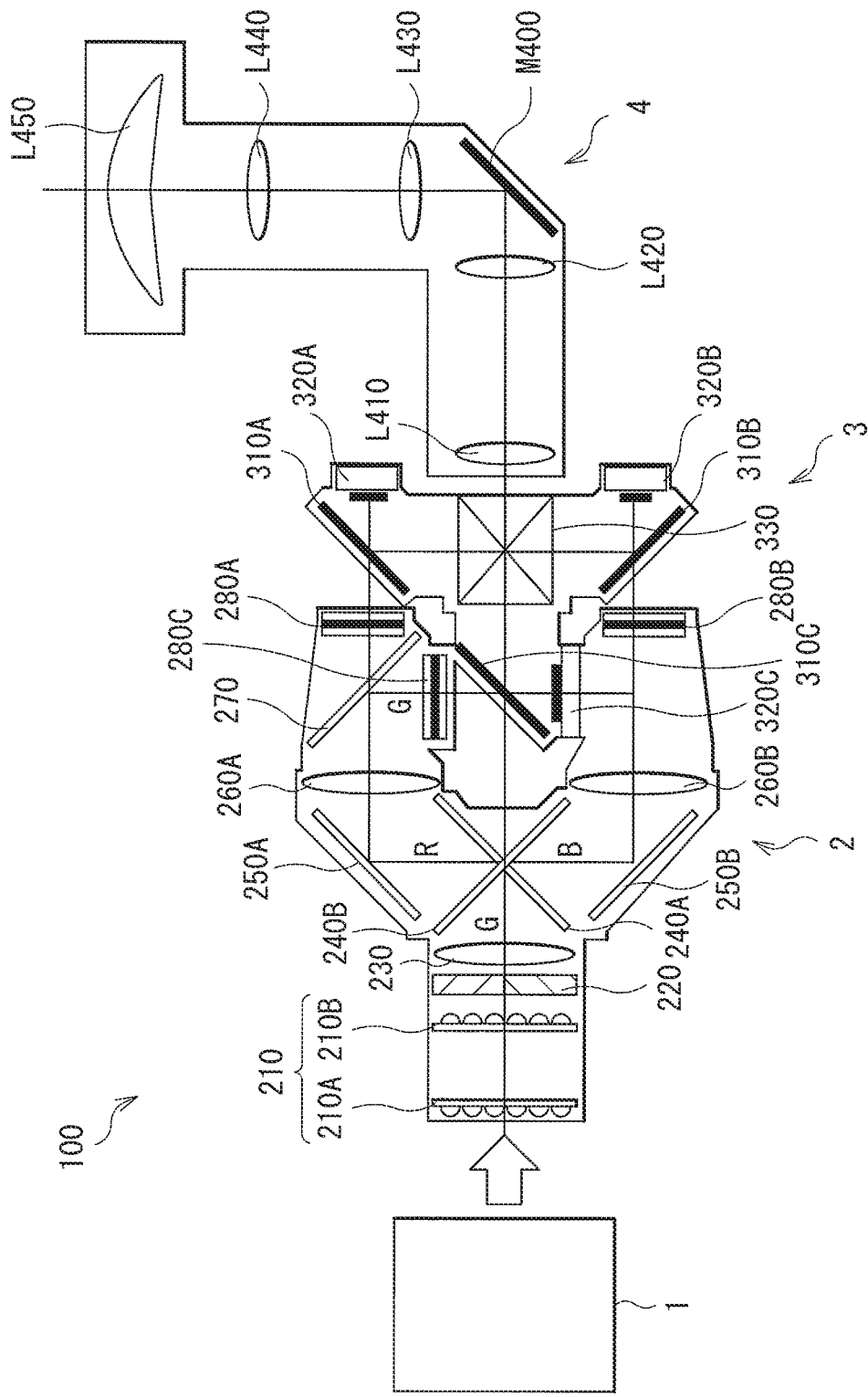

[ FIG. 13 ]
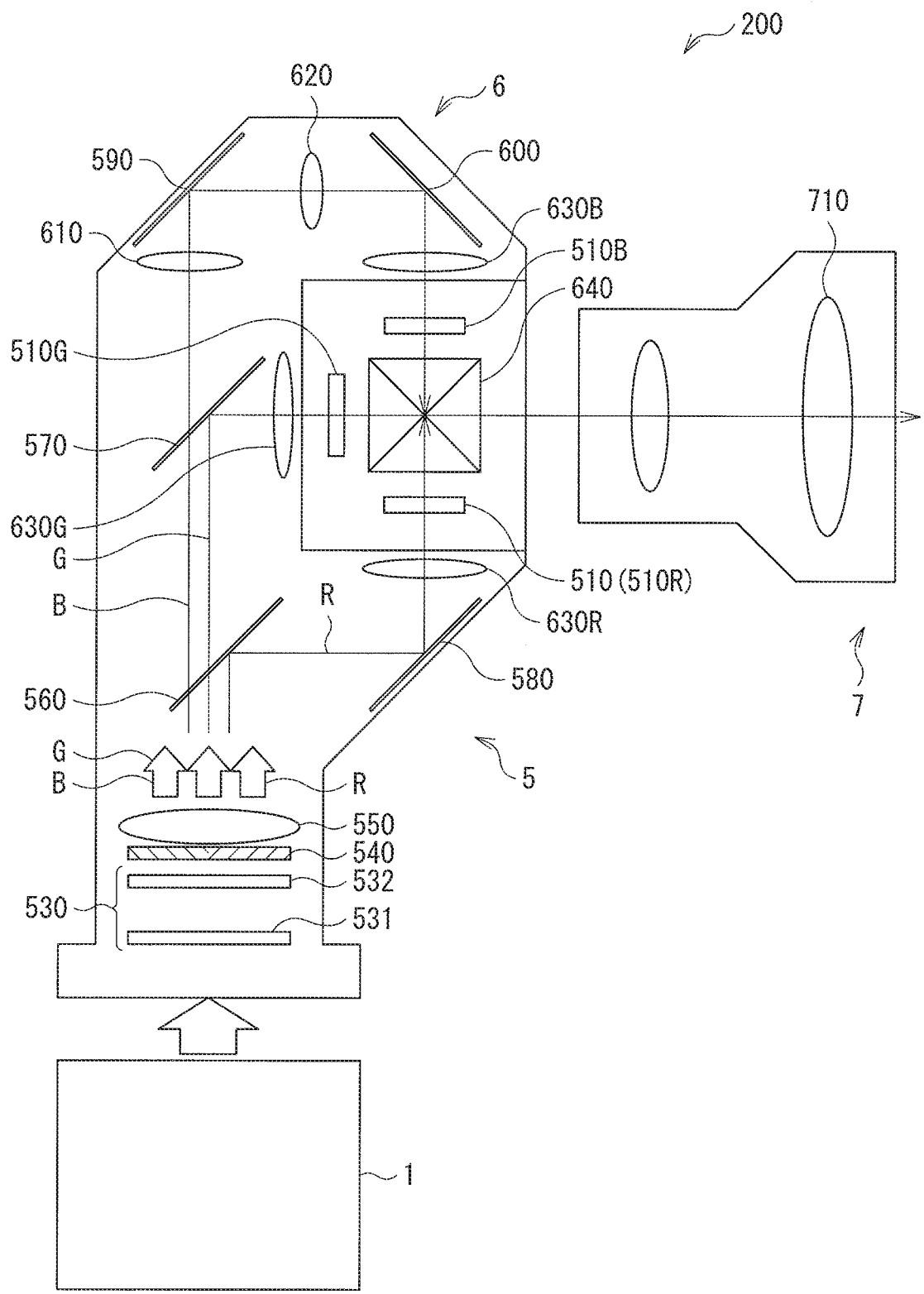

[FIG. 14]
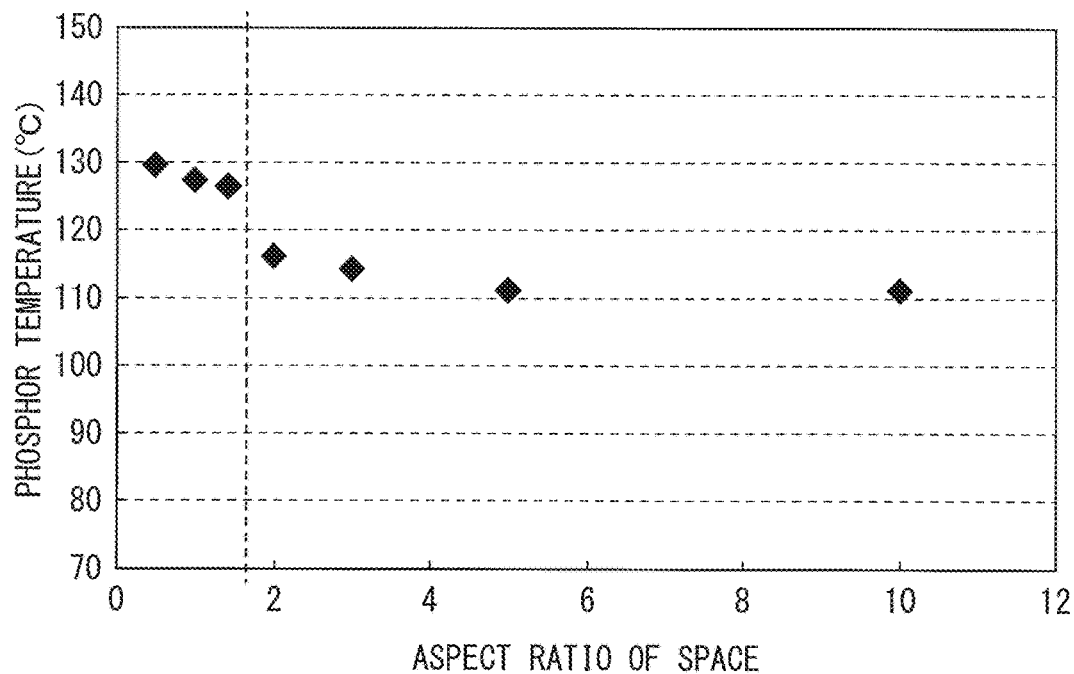
[FIG. 15A]
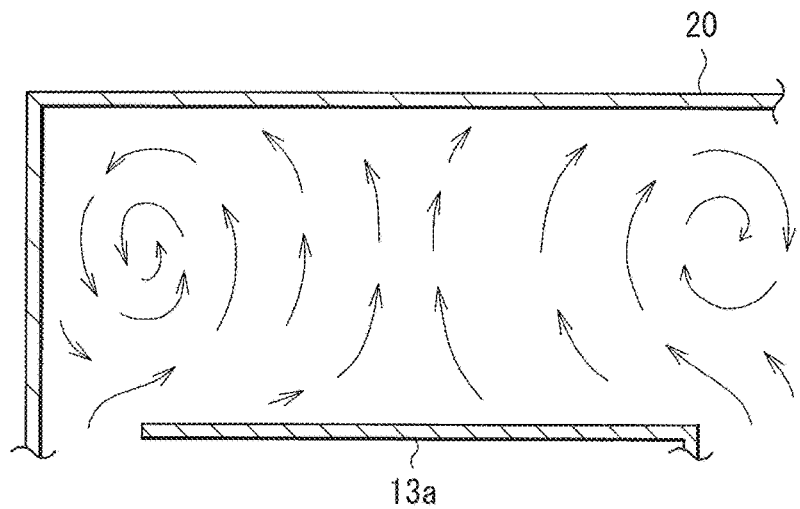
[FIG. 15B]
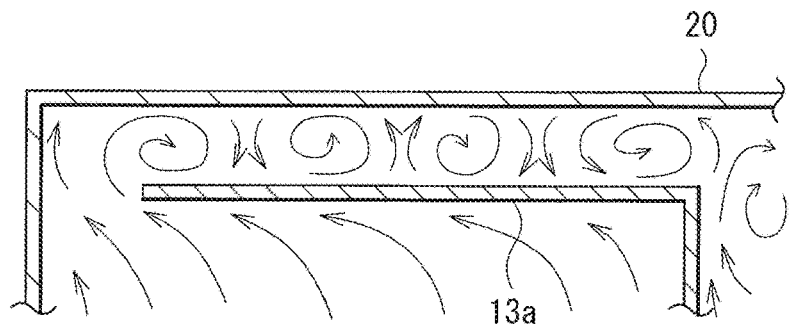

[ FIG. 16 ]
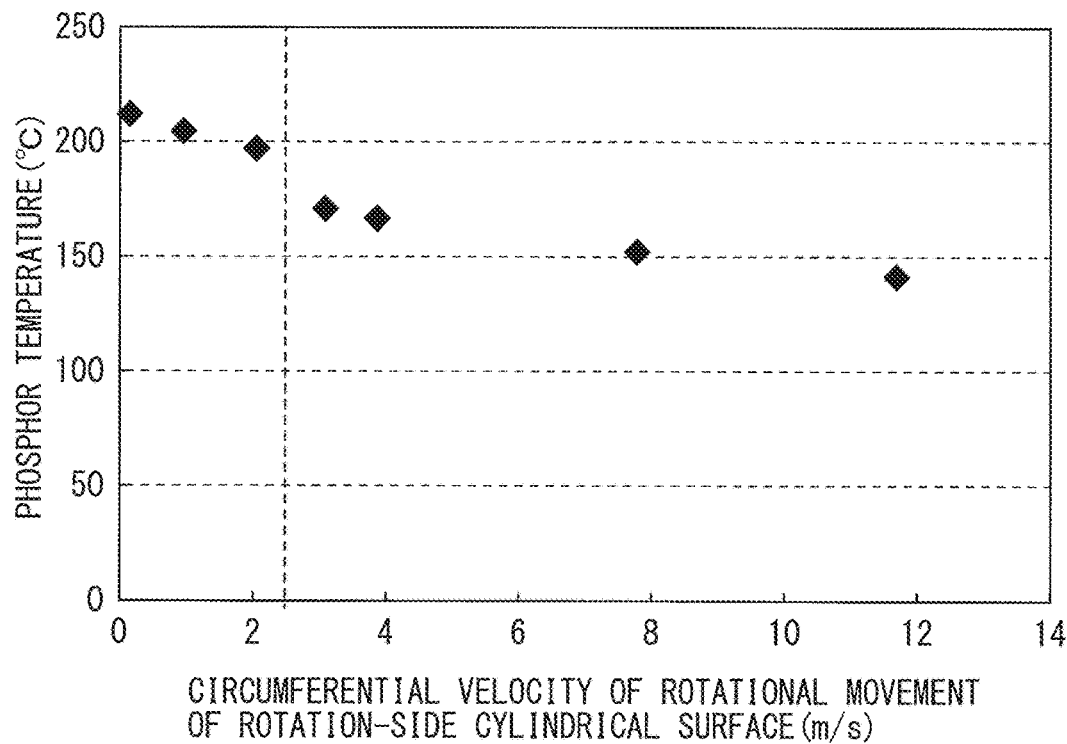
[ FIG. 17A ]
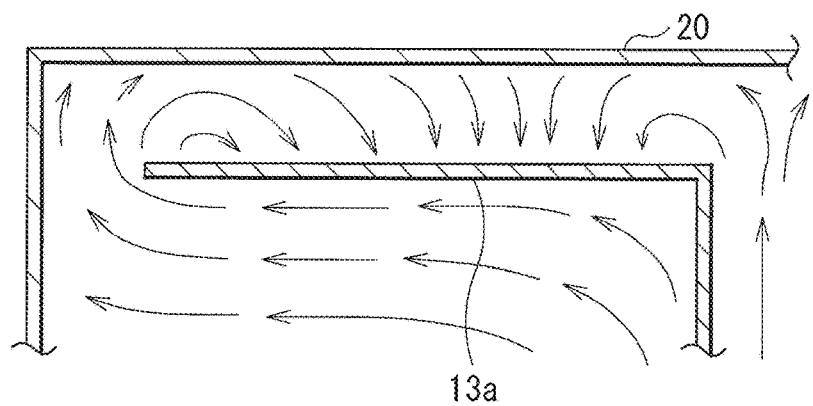
[ FIG. 17B ]
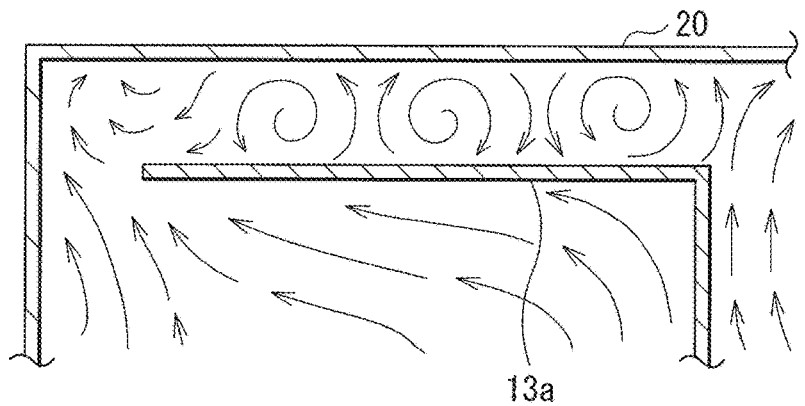

LIGHT SOURCE APPARATUS AND PROJECTION DISPLAY APPARATUS

CROSS REFERENCE TO RELATED APPLICATIONS

This application claims the benefit under 35 U.S.C. § 371 as a U.S. National Stage Entry of International Application No. PCT/JP2017/040570, filed in the Japanese Patent Office as a Receiving Office on Nov. 10, 2017, which claims priority to Japanese Patent Application Number JP 2016-245705, filed in the Japanese Patent Office on Dec. 19, 2016, each of which is hereby incorporated by reference in its entirety.

TECHNICAL FIELD

The present disclosure relates to a light source apparatus that includes, as a wavelength converter, a rotator including a light emission unit, and a projection display apparatus including the light source apparatus.

BACKGROUND ART

In recent years, for example, laser-phosphor system light source apparatuses have been widely used as light sources of projectors. The laser-phosphor system light source apparatuses extract white light by combination of fluorescence and light. The fluorescence is extracted through applying light (excitation light) emitted from a light-emitting diode (LED) or a laser diode (LD) to a wavelength converter (a phosphor unit), and the light is emitted from another LED or another LD. In such light source apparatuses, light energy applied to a phosphor except for energy extracted as the fluorescence is converted into thermal energy, which causes the phosphor unit to generate heat. An increase in temperature of the phosphor unit causes breakage of the phosphor unit, a decrease in lifetime of the phosphor unit, and a decrease in light conversion efficiency, thereby decreasing reliability of the laser-phosphor system light source apparatuses. Hence, cooling technology for the phosphor unit is important.

As the cooling technology, for example, PTL 1 discloses a light source apparatus that includes a heat sink (a heat dissipation unit) including a plurality of fins on a back surface thereof. Moreover, PTL 2 discloses a heat sink that includes a stationary portion including a plurality of fins on a surface, and a rotating structure including a plurality of fins on a surface opposed to the surface of the stationary portion. In the heat sink, the fins of the stationary portion are interdigitated with the fins of the rotating structure, and, for example, a heat generator such as a central processing unit (CPU) is provided on a side on which the stationary portion is located.

In the laser-phosphor system light source apparatuses, the wavelength converter is configured as a wheel-shaped structure in which a disk-shaped substrate including aluminum, sapphire, etc. is coated with a phosphor in a strip shape (in an annular shape). In the wavelength converter with such a structure (hereinafter referred to as a phosphor wheel), the phosphor unit is cooled through rotating the substrate by a motor, etc., or exposing the phosphor wheel to outside air with use of a blower fan.

CITATION LIST

Patent Literature

PTL 1: Japanese Unexamined Patent Application Publication No. 2012-13897

PTL 2: U.S. Unexamined Patent Application Publication No. 2016/0178289

SUMMARY OF THE INVENTION

In a light source apparatus using a phosphor wheel as a light source, a further improvement in cooling efficiency is desired.

It is desirable to provide a light source apparatus and a projection display apparatus that make it possible to improve cooling efficiency.

A light source apparatus according to an embodiment of the present disclosure includes: a rotator including a light emission unit on one surface; a heat dissipation member that is coupled to the rotator, and has a first cylindrical surface substantially parallel to a rotation axis of the rotator; and a housing that contains the rotator and the heat dissipation member, and has a second cylindrical surface substantially parallel to the first cylindrical surface of the heat dissipation member.

A projection display apparatus according to an embodiment of the present disclosure includes: a light source apparatus; an image generation optical system that modulates light from the light source apparatus on the basis of an inputted image signal to generate image light; and a projection optical system that projects the image light generated in the image generation optical system. The light source apparatus included in the projection display apparatus includes the same components as those in the foregoing light source apparatus according to the embodiment of the present disclosure.

In the light source apparatus according to the embodiment of the present disclosure and the projection display apparatus according to the embodiment of the present disclosure, the heat dissipation member that is coupled to the rotator including the light emission unit on one surface and has a cylindrical surface (the first cylindrical surface) substantially parallel to the rotation axis of the rotator is provided, and the rotator including the heat dissipation member is contained in the housing having a cylindrical surface (the second cylindrical surface) substantially parallel to the cylindrical surface of the heat dissipation member. This makes it possible to generate a Taylor vortex between the cylindrical surface of the heat dissipation member and the cylindrical surface of the housing during rotation of the rotator, thereby improving a heat transfer rate.

According to the light source apparatus according to the embodiment of the present disclosure and the projection display apparatus according to the embodiment of the present disclosure, the heat dissipation member having the cylindrical surface substantially parallel to the rotation axis of the rotator is provided for the rotator including the light emission unit, and the rotator including the heat dissipation member is contained in the housing having the cylindrical surface coaxial with the cylindrical surface of the heat dissipation member, which makes it possible to generate a Taylor vortex between two cylindrical surfaces opposed to each other. This makes it possible to improve a heat transfer rate from the cylindrical surface of the heat dissipation member to the cylindrical surface of the housing and improve cooling efficiency of the light emission unit.

It is to be noted that effects described here are not necessarily limited and may include any of effects described in the present disclosure.

BRIEF DESCRIPTION OF THE DRAWINGS

FIG. 1 is a cross-sectional view of an example of configurations of a phosphor wheel and a housing thereof included in a light source apparatus according to a first embodiment of the present disclosure.

FIG. 2 is a schematic view of planar configurations of the phosphor wheel and the housing thereof illustrated in FIG. 1.

FIG. 3 is a diagram describing a positional relationship between a heat dissipation member coupled to the phosphor wheel, and the housing illustrated in FIG. 1.

FIG. 4A is a schematic view describing a relationship between a distance from the heat dissipation member to the housing and a fluid flow.

FIG. 4B is a schematic view describing a relationship between the distance from the heat dissipation member to the housing and the fluid flow.

FIG. 4C is a schematic view describing a relationship between the distance from the heat dissipation member to the housing and the fluid flow.

FIG. 4D is a schematic view describing a relationship between the distance from the heat dissipation member to the housing and the fluid flow.

FIG. 5 is a perspective view of a configuration of an external portion of the housing containing the phosphor wheel.

FIG. 6 is a schematic view of an example of an entire configuration of a light source apparatus including the phosphor wheel illustrated in FIG. 1.

FIG. 7 is a cross-sectional view of an example of configurations of a phosphor wheel and a housing thereof included in a light source apparatus according to a second embodiment of the present disclosure.

FIG. 8 is a cross-sectional view of an example of configurations of a phosphor wheel and a housing thereof included in a light source apparatus according to a third embodiment of the present disclosure.

FIG. 9 is a cross-sectional view of an example of configurations of a phosphor wheel and a housing thereof included in a light source apparatus according to a fourth embodiment of the present disclosure.

FIG. 10 is a cross-sectional view of an example of configurations of a phosphor wheel and a housing thereof included in a light source apparatus according to a modification example of the present disclosure.

FIG. 11 is a schematic view of a portion of the light source apparatus illustrated in FIG. 10.

FIG. 12 is a schematic view of an example of a configuration example of a projection display apparatus including the light source apparatus illustrated in FIG. 6.

FIG. 13 is a schematic view of another example of the configuration example of the projection display apparatus including the light source apparatus illustrated in FIG. 6.

FIG. 14 is a characteristic diagram illustrating a relationship between a distance from the heat dissipation member to the housing and a phosphor temperature.

FIG. 15A is a schematic view of an example of a fluid flow between the heat dissipation member and the housing in a simulation 1.

FIG. 15B is a schematic view of an example of the fluid flow between the heat dissipation member and the housing in the simulation 1.

FIG. 16 is a characteristic diagram illustrating a relationship between circumferential velocity of rotational movement of a rotation-side cylindrical surface and a phosphor temperature.

FIG. 17A is a schematic view of an example of a fluid flow between the heat dissipation member and the housing in a simulation 2.

FIG. 17B is a schematic view of an example of the fluid flow between the heat dissipation member and the housing in the simulation 2.

MODES FOR CARRYING OUT THE INVENTION

In the following, some embodiments of the present disclosure are described in detail with reference to the drawings. It is to be noted that description is given in the following order.

1. First Embodiment (an example in which a heat dissipation member coupled to a phosphor wheel, and a sidewall of a housing form a coaxial double cylinder)
   1-1. Configurations of Phosphor Wheel and Its Surroundings
   1-2. Configuration of Light Source Apparatus
   1-3. Workings and Effects
2. Second Embodiment (an example in which a plurality of coaxial double cylinders is formed)
3. Third Embodiment (another example in which a plurality of coaxial double cylinders is formed)
4. Fourth Embodiment (a layout example in a case where a plurality of coaxial double cylinders are formed)
5. Modification Example (an example in which a phosphor layer is provided on a cylindrical surface forming a coaxial double cylinder)
6. Application Example (projection display apparatus)
7. Examples

1. First Embodiment

FIG. 1 illustrates an example of cross-sectional configurations of a wavelength converter (a phosphor wheel 10A) and a housing 20A included in a light source apparatus (a light source apparatus 1A) according to a first embodiment of the present disclosure. The housing 20A contains the wavelength converter. FIG. 2 illustrates planar configurations of the phosphor wheel 10A and the housing 20A containing the phosphor wheel 10A illustrated in FIG. 1. FIG. 1 illustrates a cross-sectional configuration taken along a line I-I illustrated in FIG. 2. The phosphor wheel 10A is used as, for example, a light-emitting device (a wavelength converter) included in a light source apparatus (for example, a light source apparatus 1) of a projection display apparatus (a projector 100) to be described later (for example, refer to FIGS. 6 and 12). The phosphor wheel 10A includes a phosphor layer 12 provided on one surface (a surface S1) of a supporting base 11 having a circular planar shape, for example.

The phosphor wheel 10A according to the present embodiment has a configuration in which a heat dissipation member 13 is coupled to a surface (a surface S2) opposite to the surface S1 of the supporting base 11. The heat dissipation member 13 has a cylindrical surface S3 (a first cylindrical surface) substantially parallel to a rotation axis J14A of the phosphor wheel 10A. The housing 20A has a cylindrical surface S4 (a second cylindrical surface) substantially parallel to the cylindrical surface S3 of the heat dissipation member 13. The present embodiment has a configuration in which the cylindrical surface S3 of the heat dissipation member 13 and the cylindrical surface S4 of the housing 20A form a coaxial double cylindrical structure. It is to be noted that FIGS. 1 and 2 schematically illustrate the configurations of the phosphor wheel 10A and the housing, and in some cases, dimensions and shapes thereof are different from actual dimensions and shapes.

1-1. Configurations of Phosphor Wheel and its Surroundings

The phosphor layer 12 is provided on the surface S1 of the circular (disk-shaped) supporting base 11, as described above. The phosphor layer 12 is formed in an annular shape around a center O of the supporting base 11 as a center on a peripheral edge portion of the supporting base 11, for example. The phosphor wheel 10 includes the supporting base 11 fixed to a motor 14 by, for example, an inner plate 15, and is rotatable, for example, in an arrow C direction about the rotation axis J14A during an operation of the light source apparatus 1. The phosphor wheel 10A is rotated in order to prevent a decrease in light conversion efficiency while suppressing a local increase in temperature with application of excitation light EL1 and maintaining structure stability.

The supporting base 11 serves as a substrate that supports the phosphor layer 12, and also serves as a heat dissipation member. The supporting base 11 includes, for example, an inorganic material such as a metal material and a ceramic material. As a constituent material of the supporting base 11, a material having high heat conductivity is preferable. Specifically, examples of the metal material included in the supporting base 11 include simple substances of metals such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh) and palladium (Pd) or an alloy including one or more of the metals. Alternatively, as the metal material included in the supporting base 11, it is possible to use an alloy such as CuW containing 80 at % or more of W and CuMo containing 40 at % or more of Mo. Examples of the ceramic material include a ceramic material including silicon carbide (SiC), aluminum nitride (AlN), beryllium oxide (BeO), a composite material of Si and SiC, or a composite material of SiC and Al (in which the content of SiC is 50% or more). Moreover, in addition to a simple substance of Si, SiC and a crystal material such as diamond and sapphire, it is possible to use quartz and glass. In particular, as the constituent element of the supporting base 11, the simple substances of Mo, Si, and W are preferable, which have high heat conductivity.

The phosphor layer 12 is formed on the surface S1 of the supporting base 11. The phosphor layer 12 includes, for example, a plurality of phosphor particles bound to one another by a binder. The binder binds one phosphor particle to another phosphor particle adjacent to the one phosphor particle. The binder includes, for example, a cross-linked body of an inorganic material such as water glass. The water glass indicates a silicate compound that is also referred to as sodium silicate, potassium silicate, or silicate soda, and indicates a liquid in which $SiO_2$ (anhydrous silicic acid) and $Na_2O$ (sodium oxide) or $K_2O$ (potassium oxide) are mixed at a predetermined ratio. Water glass is represented by a molecular formula of $Na_2O.nSiO_2$.

The phosphor particles include a particulate phosphor that absorbs the excitation light EL1 (for example, laser light) applied from outside to emit fluorescence FL. For example, the phosphor particles include a fluorescent material that is excited by blue laser light having a wavelength in a blue wavelength range (for example, from 400 nm to 470 nm) to emit yellow fluorescence (light in a wavelength range between a red wavelength range and a green wavelength range). As such a fluorescent material, for example, YAG (yttrium aluminum garnet)-based material is used.

It is to be noted that the phosphor layer 12 is preferably formed on the supporting base 11 with a reflection layer (not illustrated) interposed therebetween. The reflection layer functions to reflect the excitation light EL1 applied from outside and the fluorescence FL emitted from the phosphor layer 12, thereby enhancing light emission efficiency in the phosphor wheel 10A. The reflection layer includes, in addition to a dielectric multilayer film, a metal film including a metal element such as aluminum (Al), silver (Ag), or titanium (Ti), etc., for example. It is to be noted that in a case where the supporting base 11 includes a material having light reflectivity, the reflection layer may be omitted where appropriate.

In the phosphor wheel 10A according to the present embodiment, the heat dissipation member 13 is coupled to the surface S2 of the supporting base 11, as described above. The heat dissipation member 13 includes a coupling unit 131 and a fin 13a. The coupling unit 131 is coupled to the surface S2 of the supporting base 11, and the fin 13a is provided through bending an end surface, in a peripheral edge direction of the supporting base 11, of the coupling unit 131 to a side opposite to the surface S1 of the supporting base 11. The fin 13a is bent in a direction substantially parallel to the rotation axis J14A of the phosphor wheel 10A, and the fin 13a forms the foregoing cylindrical surface S3.

The heat dissipation member 13 is coupled to the supporting base 11 through the coupling unit 131, which is made rotatable around the axis J14A together with the supporting base 11 during the operation of the light source apparatus 1. The fin 13a is bent in the direction substantially parallel to the rotation axis J14A of the phosphor wheel 10A, and forms the cylindrical surface S3 substantially parallel to the rotation axis J14A of the phosphor wheel 10A, as described above. The cylindrical surface S3 is preferably formed as a continuous surface around the rotation axis J14A as a center, but may have, for example, an incision extending in a rotation axis direction at one or more spots. The heat dissipation member 13 preferably includes a material having high heat conductivity. Specifically, the heat dissipation member 13 desirably includes, for example, pure aluminum, an aluminum alloy, a copper alloy such as beryllium copper, a carbon material, graphite, etc.

The housing 20A contains the phosphor wheel 10A including the heat dissipation member 13. The housing 20A has the cylindrical surface S4 substantially parallel to the cylindrical surface S3 of the heat dissipation member 13, as described above. In other words, the housing 20A has the cylindrical surface S4 (a second cylindrical surface) substantially parallel to the rotation axis J14A of the phosphor wheel 10A. Namely, the housing 20A has the cylindrical surface S4 coaxial with the cylindrical surface S3 of the heat dissipation member 13.

It is sufficient if the housing 20A has at least the cylindrical surface S4 opposed to the cylindrical surface S3 of the heat dissipation member 13. In other words, the housing 20A may be a sealed housing that completely isolates the phosphor wheel 10A from outside, or an open housing that is open on sides on which the surface S1 (a front surface) and the surface S2 (a back surface) of the supporting base 11 are located. Moreover, in the housing 20A, the cylindrical surface S4 may configure a side surface of the housing 20A, or may be a structure formed inside the housing 20A. In other words, as long as the housing 20A has at least the cylindrical surface S3 of the heat dissipation member 13 and the cylindrical surface S4 that forms a coaxial double cylindrical structure, an appearance of the housing 20A may have, for example, a cylindrical shape illustrated in FIG. 5 to be described later, or may have, for example, a polygonal shape such as a rectangular shape. The housing 20A preferably includes a material having high heat conductivity. Specifically, the housing 20A desirably includes, for example, pure aluminum, an aluminum alloy, a copper alloy such as beryllium copper, etc.

In the light source apparatus 1 according to the present embodiment, as described above, the phosphor wheel 10A (the cylindrical surface S3 of the heat dissipation member 13) and the housing 20A (the cylindrical surface S4) form a coaxial double cylindrical structure. In the double cylindrical structure, the cylindrical surface S3 of the heat dissipation member 13 serves as a rotation surface, the cylindrical surface S4 of the housing 20A serves as a fixed surface, and the cylindrical surface S3 is rotated. In other words, the operation of the light source apparatus 1 makes it possible to generate a Taylor vortex in fluid (for example, air) between the cylindrical surface S3 and the cylindrical surface S4. The Taylor vortex generated between the cylindrical surface S3 and the cylindrical surface S4 makes it possible to efficiently transfer heat, which is generated at a light emission point X of the phosphor layer 12 by application of the excitation light EL1 and is transferred from the supporting base 11 to the heat dissipation member 13, through the fluid between the cylindrical surface S3 and the cylindrical surface S4.

In order to efficiently generate the Taylor vortex, for example, the following configuration is preferable. First, a distance from the cylindrical surface S3 of the heat dissipation member 13 to the cylindrical surface S4 of the housing 20A preferably has an aspect ratio of 2 or more in a cross-sectional view of the heat dissipation member 13 and the housing 20 illustrated in FIG. 3. The aspect ratio is represented by a length (A) in a direction parallel to the rotation axis J14A of a portion formed through opposing the cylindrical surface S3 and the cylindrical surface S4 to each other (that is, a length of the cylindrical surface S3 (the fin 13a))/a distance (B) from the cylindrical surface S3 to the cylindrical surface S4). An upper limit of the aspect ratio is preferably 10 or less, for example. This is because in a case where the aspect ratio exceeds 10, an effect of improving cooling performance is reduced. Moreover, this is because in a case where the aspect ratio is 10 or more, that is, a portion corresponding to the fin 13a forming the cylindrical surface S3 becomes larger, a level of difficulty in manufacturing the heat dissipation member 13 becomes higher. Further, as the portion corresponding to the fin 13a becomes larger, noise during rotation is increased. Hence, the aspect ratio is desirably 5 or less in terms of quietness.

FIGS. 4A to 4D schematically illustrate results of verification of a fluid flow between the cylindrical surface S3 and the cylindrical surface S4 in respective distances (B1, B2, B3, and B4) with use of thermal fluid simulation software. It is to be noted that the length (A) of the cylindrical surface S3 is 10 mm, and is the same in all the distances. In FIG. 4A (an aspect ratio of 1.4) in which the distance (B1) from the cylindrical surface S3 to the cylindrical surface S4 is 7 mm, a flow of fluid moving from a side on which the coupling unit 131 of the heat dissipation member 13 is located toward an edge of the cylindrical surface S3 is formed, but it is not possible to confirm formation of a vortex between the cylindrical surface S3 and the cylindrical surface S4. In contrast, in FIG. 4B (an aspect ratio of 2.0) in which the distance (B2) from the cylindrical surface S3 to the cylindrical surface S4 is 5 mm, it is possible to confirm formation of two vortices between the cylindrical surface S3 and the cylindrical surface S4. In FIG. 4C (an aspect ratio of 3.0) in which the distance (B3) from the cylindrical surface S3 to the cylindrical surface S4 is 3.34 mm, it is possible to confirm formation of three vortices between the cylindrical surface S3 and the cylindrical surface S4. Moreover, in FIG. 4D (an aspect ratio of 5.0) in which the distance (B4) from the cylindrical surface S3 to the cylindrical surface S4 is small (2 mm), it is possible to confirm formation of four vortices between the cylindrical surface S3 and the cylindrical surface S4. As described above, decreasing the distance (B) from the cylindrical surface S3 to the cylindrical surface S4 to increase the aspect ratio makes it possible to increase the number of vortices (Taylor vortices) generated between the cylindrical surface S3 and the cylindrical surface S4. Heat conduction efficiency from the fin 13a of the heat dissipation member 13 to the side surface of the housing 20A is improved by generation of a large number of vortices between the cylindrical surface S3 and the cylindrical surface S4. In other words, it is possible to efficiently transfer, to the housing 20A, heat generated at the light emission point X of the phosphor layer 12, thereby efficiently cooling the light emission point X.

In order to efficiently generate the Taylor vortex, it is preferable to increase circumferential velocity of rotational movement of a rotation-side cylindrical surface, that is, the cylindrical surface S3 of the heat dissipation member 13. As will be described in detail later, the circumferential velocity is preferably 3.12 m/s or more. An upper limit of the circumferential velocity of the rotational movement of the cylindrical surface S3 is preferably, for example, 70 m/s or less. This is because in a case where rotational velocity is increased, there is a possibility that noise is increased.

In a case where the housing 20A has a sealed structure, the housing 20A may be filled with a gas having higher heat conductivity than air, in addition to air as fluid. Specifically, the housing 20A is preferably filled with a gas having higher heat conductivity than heat conductivity (heat conductivity of 0.0257 W/mK in an environment at 20° C.) of air. Examples of such a gas include helium (He). Not only the gas but also a liquid may be sealed in the housing 20A. Examples of the liquid sealed in the housing 20A include water, a silicon oil, etc., and a liquid having lowest possible viscosity is preferably selected. It is to be noted that in a case where the liquid is sealed in the housing 20A, it is possible to rotate the phosphor wheel 10A with use of magnet-driving.

Moreover, for example, a heat dissipation structure may be provided outside the housing 20A, as illustrated in FIG. 5. This makes it possible to improve heat exhaust efficiency in the housing 20A. In the heat dissipation structure illustrated in FIG. 5, a plurality of heat pipes 21 is mounted on a surface of the housing 20A, and a heat sink 22 is coupled to ends of the heat pipes 21. Heat transferred from the phosphor wheel 10A to the housing 20A is further transferred to the heat pipes 21, and is diverged into air by the heat sink 22 coupled to the ends of the heat pipes 21. Examples of other heat dissipation structures include a liquid cooling system. In the liquid cooling system, a pipe is mounted on, for example, a surface or a side surface of the housing 20A, and a cooling medium flows in the pipe, which causes heat of the housing 20A to be transferred to the cooling medium, thereby cooling the housing 20A. The heat transferred to the cooling medium is diverged into air by a radiator, etc.

1-2. Configuration of Light Source Apparatus

FIG. 6 illustrates an entire configuration of the light source apparatus 1 including the phosphor wheel 10A illustrated in FIGS. 1 and 2. It is to be noted that the housing 20A is not illustrated in FIG. 6.

The light source apparatus 1 includes the phosphor wheel 10A as a phosphor wheel, a light source unit 62 that emits excitation light or laser light, lenses 63 to 66, a dichroic mirror 67, a reflective mirror 68, and a diffuser 69. The phosphor wheel 10A (a phosphor wheel 10) is rotatably supported by the rotation axis J14A. The diffuser 69 is rotatably supported by an axis J69A. The light source unit 62 includes a first laser group 62A and a second laser group 62B. The first laser group 62A includes a plurality of semiconductor laser devices 621A that oscillates excitation light (for example, a wavelength of 445 nm or 455 nm), and the second laser group 62B includes a plurality of semiconductor laser devices 621B that oscillates blue laser light (for example, a wavelength of 465 nm). Herein, for the sake of convenience, the excitation light oscillated by the first laser group 62A is denoted by EL1, and the blue laser light (hereinafter simply referred to as blue light) oscillated by the second laser group 62B is denoted by EL2.

The phosphor wheel 10A is disposed to cause the excitation light EL1 having passed through the lens 63, the dichroic mirror 67, and the lens 64 from the first laser group 62A to enter the phosphor layer 12. The fluorescence FL obtained by conversion in the phosphor layer 12 is reflected by the supporting base 11 toward a side on which the light source unit 62 is located, and is reflected by the dichroic mirror 67 toward the lens 65. The fluorescence FL reflected by the dichroic mirror 67 passes through the lens 65 and is directed toward outside, that is, toward the illumination optical system 2 (refer to FIG. 12).

The diffuser 69 diffuses the laser light EL2 from the second laser group 62B through the reflective mirror 68. The laser light EL2 diffused by the diffuser 69 passes through the lens 66 and the dichroic mirror 67, and thereafter, passes through the lens 65 and is directed toward outside, that is, toward the illumination optical system 2, together with the fluorescence FL.

It is to be noted that a cooling fan is desirably provided in the light source apparatus 1 in order to cool heat generated in the phosphor layer 12 in association with application of the excitation light EL1 and the laser light EL2. Moreover, a layout of respective members included in the light source apparatus 1 is not limited to the configuration illustrated in FIG. 6.

1-3. Workings and Effects

As described above, in a laser-phosphor system light source apparatus, development of cooling technology for a phosphor unit is desired for an improvement in light conversion efficiency and prevention of a decrease in reliability.

In the laser-phosphor system light source apparatus, the wavelength converter is configured as a wheel-shaped structure in which a disk-shaped substrate including aluminum, sapphire, etc. is coated with a phosphor in a strip shape (in an annular shape). In the phosphor wheel with such a structure, the phosphor unit is cooled through rotating the substrate by a motor, etc. Moreover, forced air cooling is performed through exposing the phosphor wheel to outside air with use of a fan for blowing. Further, a cooling fin is coupled to the substrate to increase a heat dissipation area, thereby securing cooling performance.

However, the cooling methods described above cause generation of noise by a blower fan and a decrease in reliability resulting from an increase in load on a motor by an increase in the number of structures such as the cooling fin, and also lead to an increase in a volume of the entire light source apparatus. Moreover, in order to avoid a decrease in luminance or breakage caused by adhesion of a foreign matter, optical components such as the phosphor wheel and a converging lens are surrounded or sealed by a housing in many cases. In a case where the optical components such as the phosphor wheel and the converging lens are contained and sealed in the housing, it is necessary to re-cool cooling air that is warmed by cooling of the phosphor wheel. It is considered to mount a heat exchanger in a cooling air circulation flow channel for re-cooling of the cooling air inside the housing; however, in this case, the number of structures such as the heat exchanger and a flow channel duct is increased, thereby largely increasing the volume of a cooling unit.

As the cooling technology, as described above, there have been developed a heat sink including a plurality of fins on a back surface thereof, and a heat sink that includes a stationary portion including a plurality of fins on a surface, and a rotating structure including a plurality of fins on a surface opposed to the surface of the stationary portion. The fins of the stationary portion are interdigitated with the fins of the rotating structure. In the heat sink including the stationary portion and the rotating structure, a heat generator is disposed on a side on which the stationary portion is located. In the heat sink, an interval between the fin of the stationary portion and the fin of the rotating structure is from 2.5 μm to 200 μm, which is narrow, and heat from the stationary portion to the rotating structure is transferred mostly between the fins. Moreover, the interval between the fin of the stationary portion and the fin of the rotating structure is extremely narrow, which causes a difficulty in alignment, thereby causing a possibility that the fins are broken by contact between the fins.

In contrast, in the light source apparatus 1 according to the present embodiment, the heat dissipation member 13 including the fin 13a that forms the cylindrical surface S3 substantially parallel to the rotation axis J14A of the phosphor wheel 10A is provided on the surface S2 of the supporting base 11 of the phosphor wheel 10A. Moreover, the phosphor wheel 10A including the heat dissipation member 13 is contained in the housing 20A having the cylindrical surface S4 substantially parallel to the rotation axis J14A of the phosphor wheel 10A, as with the cylindrical surface S3 formed by the fin 13a. Accordingly, coaxial double cylinders having the cylindrical surface S3 of the heat dissipation member 13 and the cylindrical surface S4 of the housing 20A are formed, and the cylindrical surface S3 of an inner one of the double cylinders is rotated by the operation of the light source apparatus 1 to generate a Taylor vortex in fluid between the double cylinders. The Taylor vortex makes it possible to efficiently transfer, to the housing 20A, heat diverged from the light emission point X to the fin 13a of the heat dissipation member 13 through the supporting base 11. In other words, heat generated at the light emission point X of the phosphor layer 12 by application of the excitation light EL1 is efficiently transferred to the housing 20A through the fluid between the cylindrical surface S3 and the cylindrical surface S4.

As described above, in the present embodiment, the heat dissipation member 13 having the cylindrical surface S3 substantially coaxial with the rotation axis J14A of the phosphor wheel 10A is disposed on the surface S2 of the supporting base 11 of the phosphor wheel 10A, and the phosphor wheel 10A including the heat dissipation member 13 is contained in the housing 20A having the cylindrical surface S4 substantially coaxial with the cylindrical surface S3. Accordingly, in a case where the light source apparatus 1 is operated, the Taylor vortex is generated between the cylindrical surface S3 and the cylindrical surface S4, thereby improving a heat transfer rate from the fin 13a of the heat dissipation member 13 to the side surface of the housing 20A. This makes it possible to improve cooling efficiency at the light emission point X of the phosphor wheel 10A without providing a cooling member inside the housing 20A.

Moreover, a blower fan and a heat exchangers such as an internal heat sink are not necessary inside the housing 20A, which makes it possible to reduce a volume of the cooling member and downsize the light source apparatus 1. Further, in a case where the housing 20A has a sealed structure, pressure in a sealed flow channel by the blower fan is not varied; therefore, sealability is easily secured.

Furthermore, for example, a flow dust structure from the blower fan is not necessary in the light source apparatus 1, which makes it easy to design a sealing mechanism. In addition, it is possible to reduce the number of blower fans provided in the light source apparatus 1 and a projector including the light source apparatus 1, which makes it possible to achieve noise reduction. Moreover, it is possible to reduce cost.

Next, description is given of second to fourth embodiments and a modification example of the present disclosure. In the following, components similar to those of the foregoing first embodiment are denoted by same reference numerals, and description thereof is omitted where appropriate.

2. Second Embodiment

FIG. 7 illustrates cross-sectional configurations of a wavelength converter (a phosphor wheel 10B) and a housing 20B included in a light source apparatus (a light source apparatus 1B) according to a second embodiment of the present disclosure. The housing 20B contains the wavelength converter. The phosphor wheel 10B is used as a light-emitting device (a wavelength converter) included in the foregoing light source apparatus 1, for example.

The phosphor wheel 10B according to the present embodiment has a configuration in which the heat dissipation member 23 is coupled to the surface (the surface S2) opposite to the surface S1 of the supporting base 11. The heat dissipation member 23 includes a coupling unit 231 and two fins 23a1 and 23a2. The coupling unit 231 is coupled to the surface S2 of the supporting base 11, and the two fins 23a1 and 23a2 are provided through bending both ends of the coupling unit 231 to the side opposite to the surface S1 of the supporting base 11 in the direction substantially parallel to the rotation axis J14A. In other words, two cylindrical surfaces S3 are formed in the heat dissipation member 23 according to the present embodiment.

In the housing 20B according to the present embodiment, fins 20a1 and 20a2 are formed. The fins 20a1 and 20a2 form the cylindrical surfaces S4 substantially parallel to the cylindrical surfaces S3. The cylindrical surfaces S4 are paired with the two cylindrical surface S3 formed by the fins 23a1 and 23a2 of the heat dissipation member 23.

As described above, in the present embodiment, the heat dissipation member 23 including the fins 23a1 and 23a2 forming the two cylindrical surfaces S3 is disposed on the surface S2 of the supporting base 11 of the phosphor wheel 10B, and the fins 20a1 and 20a2 forming the cylindrical surfaces S4 paired with the two cylindrical surfaces S3 are provided in the housing 20B. This makes it possible to generate the Taylor vortex each between the fin 23a1 of the heat dissipation member 23 and the fin 20a1 of the housing 20B and between the fin 23a2 of the heat dissipation member 23 and the fin 20a2 of the housing 20B in a case where the light source apparatus 1B is operated. Accordingly, it is possible to improve cooling efficiency at the light emission point X of the phosphor wheel 10B more than the light source apparatus 1A according to the foregoing first embodiment.

It is to be noted that in the present embodiment, an example in which the fin 20a1 forms the cylindrical surface S4 paired with the cylindrical surface S3 formed by the fin 23a1 located close to the housing 20B of the heat dissipation member 23 is described; however, the present embodiment is not limited thereto. If the fin 23a1 is disposed closer to the housing 20B to allow the foregoing aspect ratio to be 2 or more, a side surface of the housing 20B may form the cylindrical surface S4.

3. Third Embodiment

FIG. 8 illustrates cross-sectional configurations of a wavelength converter (a phosphor wheel 10C) and the housing 20C included in a light source apparatus (a light source apparatus 1C) according to the third embodiment of the present disclosure. The housing 20C contains the wavelength converter. The phosphor wheel 10C is used as a light-emitting device (a wavelength converter) included in the foregoing light source apparatus 1, for example.

The phosphor wheel 10C according to the present embodiment has a configuration in which two heat dissipation member 33A and 33B are provided on the surface (the surface S2) opposite to the surface S1 of the supporting base 11. As with the foregoing second embodiment, the heat dissipation member 33A includes a coupling unit 331A and two fins 33a1 and 33a2. The coupling unit 331A is coupled to the surface S2 of the supporting base 11, and the two fins 33a1 and 33a2 are provided through bending both ends of the coupling unit 331A to the side opposite to the surface S1 of the supporting base 11 in the direction substantially parallel to the rotation axis J14A. The heat dissipation member 33B includes a coupling unit 331B and a fin 33b. The coupling unit 331B is coupled to the surface S2 of the supporting base 11, and the fin 33b is provided through bending an end of the coupling unit 331B to a side on which the surface S1 of the supporting base 11 is located in the direction substantially parallel to the rotation axis J14A. In other words, in the heat dissipation member 33 according to the present embodiment, three cylindrical surfaces S3 formed by the fins 33a1, 33a2, and 33b are formed. It is to be noted that the heat dissipation member 33B is disposed between the supporting base 11 and the heat dissipation member 33A, for example.

In the housing 20C according to the present embodiment, as with the foregoing second embodiment, the fins 20a1 and 20a2 are formed. The fins 20a1 and 20a2 form the cylindrical surfaces S4 paired with the two cylindrical surfaces S3 formed by the fins 33a1 and 33a2 of the heat dissipation member 33. Moreover, the cylindrical surface S4 paired with the cylindrical surface S3 formed by the fin 33b of the heat dissipation member 33B is formed by the side surface of the housing 20C.

As described above, in the present embodiment, the dissipation members 33A and 33B including the fins 33a1, 33a2, and 33b that form three cylindrical surfaces S3 are disposed on the surface S2 of the supporting base 11 of the phosphor wheel 10C, and the fins 20a1 and 20a2 that form the cylindrical surfaces S4 paired with two cylindrical surfaces S3 formed by the fins 33a1 and 33a2 of the heat dissipation member 33A are provided in the housing 20C. Moreover, the side surface of the housing 20C is used as the cylindrical surface S4 paired with the cylindrical surface S3 formed by the fin 33b of the heat dissipation member 33B. This makes it possible to generate the Taylor vortex in each of three spaces including a space between the fin 33a1 of the heat dissipation member 33A and the fin 20a1 of the housing 20C, a space between the fin 33a2 of the heat dissipation member 33A and the fin 20a2 of the housing 20C, and a space between the fin 33b of the heat dissipation member 33B and the side surface of the housing 20C in a case where the light source apparatus 1B is operated. Accordingly, it is possible to improve cooling efficiency at the light emission point X of the phosphor wheel 10C more than the light source apparatuses 1A and 1B according to the foregoing first and second embodiments.

4. Fourth Embodiment

FIG. 9 illustrates cross-sectional configurations of a wavelength converter (a phosphor wheel 10D) and a housing 20D included in a light source apparatus (a light source apparatus 1D) according to a fourth embodiment of the present disclosure. The housing 20D contains the wavelength converter. The phosphor wheel 10D is used as a light-emitting device (a wavelength converter) included in the foregoing light source apparatus 1, for example.

The phosphor wheel 10D according to the present embodiment has a configuration in which a heat dissipation member 43 is coupled to the surface (the surface S2) opposite to the surface S1 of the supporting base 11. The heat dissipation member 43 includes a coupling unit 431 and a plurality of fins 43a1 to 43an. The coupling unit 431 is coupled to the surface S2 of the supporting base 11, and the plurality of fins 43a1 to 43an extends from the coupling unit 431 to a side opposite to the surface S1 of the supporting base 11 in the direction substantially parallel to the rotation axis J14A. In other words, in the heat dissipation member 43 according to the present embodiment, a plurality of cylindrical surfaces S3 is formed concentrically about a center O of the phosphor wheel 10D as a center.

In the housing 20D according to the present embodiment, a plurality of fins 20a1 to 20am is formed. The plurality of fins 20a1 to 20am forms the cylindrical surfaces S4 paired with the plurality of cylindrical surfaces S3 formed by the fins 43a1 to 43an of the heat dissipation member 43.

As described above, in the present embodiment, the heat dissipation member 43 including the fins 43a1 to 43an that form the plurality of cylindrical surfaces S3 is disposed on the surface S2 of the supporting base 11 of the phosphor wheel 10D, and the fins 20a1 to 20am are provided in the housing 20D. The fins 20a1 to 20am form the cylindrical surfaces S4 paired with the cylindrical surfaces S3 formed by the fins 43a1 to 43an. This makes it possible to generate the Taylor vortex between each of the fin 43a1 to 43an of the heat dissipation member 43 and a corresponding one of the fin 20a1 to 20an of the housing 20D in a case where the light source apparatus 1D is operated. Accordingly, it is possible to improve cooling efficiency at the light emission point X of the phosphor wheel 10D more than the light source apparatuses 1A, 1B, and 1C according to the foregoing first, second, and third embodiments.

It is to be noted that the number (n) of the fins 43a1 to 43an of the heat dissipation member 43 and the number (m) of the fin 20a1 to 20am are not necessarily equal to each other. More fins of the heat dissipation member 43 may be formed, or more fins of the housing 20D may be formed.

Moreover, in a case where the plurality of fins 43a1 to 43an and the plurality of fins 20a1 to 20am are provided on a side on which the surface S2 of the supporting base 11 is located, fins are preferably disposed more tightly in a region X corresponding to the phosphor layer 12 in proximity to a light emission unit that generates heat than in other regions Y. This makes it possible to efficiently cool the light emission point X of the phosphor layer 12.

5. Modification Example

FIG. 10 illustrates cross-sectional configurations of a wavelength converter (a phosphor wheel 10E) and the housing 20A included in a light source apparatus (a light source apparatus 1E) according to a modification example of the present disclosure. The housing 20A contains the wavelength converter. The phosphor wheel 10E is used as a light-emitting device (a wavelength converter) included in the foregoing light source apparatus 1, for example. FIG. 11 illustrates schematic configurations of the phosphor wheel 10E, the housing 20A, and various kinds of lenses (lenses 63 and 64). The lenses are included in the light source apparatus 1E.

The phosphor wheel 10E according to the modification example has a configuration in which an outer peripheral edge portion of a supporting base 51 is bent substantially parallel to the rotation axis J14A to a side on which the surface (the surface S2) opposite to the surface S1 is located. In the present modification example, a portion (a bent portion 512A) bent substantially parallel to the rotation axis J14A forms the cylindrical surface S3. In the present modification example, the phosphor layer 12 is formed on the bent portion 51A.

As described above, the outer peripheral edge portion of the supporting base 51 is bent substantially parallel to the rotation axis J14A, and the phosphor layer 12 is formed on the bent portion 51A, which makes it possible to transfer heat generated in the phosphor layer 12 directly to the housing 20A through the Taylor vortex.

It is to be noted that in the present modification example, the supporting base 51 is bent to the side on which the surface S2 is located as the bent portion 51A; however, the bent portion 51A may have a shape bent to a side on which the surface S1 is located. Moreover, the phosphor layer 12 may be provided on the surface S1 as with the foregoing first to fourth embodiments. Further, in the light source apparatus 1E including the phosphor wheel 10E according to the present modification example, optical members such as the lenses 63 and 64 included in the light source apparatus 1E are disposed to be directly opposed to the side surface of the housing 20A, as illustrated in FIG. 11.

6. Application Examples

Next, description is given of projection display apparatuses (projectors 100 and 200) including the light source apparatus 1 that includes the phosphor wheel 10A (or any of the phosphor wheels 10B, 10C, 10D, and 10E) with reference to FIGS. 12 and 13. FIG. 12 exemplifies a reflective 3LCD projector (the projector 100) that performs light modulation by a reflective liquid crystal panel (LCD). FIG. 13 exemplifies a reflective 3LCD projector (the projector 200) that performs light modulation by a transmissive liquid crystal panel (LCD). It is to be noted that the projection display apparatus according to the present disclosure is also applicable to, for example, a projector using a digital micromirror device (DMD), etc. in place of the reflective liquid crystal panel and the transmissive liquid crystal panel.

Application Example 1

FIG. 12 illustrates an example of a configuration of the reflective 3LCD projector 100 that performs light modulation by the reflective liquid crystal panel (LCD). The projector 100 includes, for example, the light source apparatus 1 (a light source apparatus) described in the foregoing first embodiment, an illumination optical system 2, an image-forming unit 3 (an image generation optical system), and a projection optical system 4 (a projection optical system) in order.

The illumination optical system 2 includes, for example, fly-eye lenses 210 (210A and 210B), a polarization conversion device 220, a lens 230, dichroic mirrors 240A and 240B, reflective mirrors 250A and 250B, lenses 260A and 260B, a dichroic mirror 270, and polarizing plates 280A to 280C from a position close to the light source apparatus 1.

The fly-eye lenses 210 (210A and 210B) homogenize an illuminance distribution of white light from the lens 65 of the light source apparatus 1. The polarization conversion device 220 functions to orient a polarization axis of incident light to a predetermined direction. For example, the polarization conversion device 220 converts light other than P-polarized light into P-polarized light. The lens 230 condenses light from the polarization conversion device 220 toward the dichroic mirrors 240A and 240B. The dichroic mirrors 240A and 240B selectively reflect light in a predetermined wavelength range, and selectively allow light in a wavelength range other than the predetermined wavelength range to pass therethrough. For example, the dichroic mirror 240A reflects mainly red light to a direction of the reflective mirror 250A. Moreover, the dichroic mirror 240B reflects mainly blue light to a direction of the reflective mirror 250B. Accordingly, green light passes through both the dichroic mirrors 240A and 240B to be directed to a reflective polarizing plate 310C (to be described later) of the image-forming unit 3. The reflective mirror 250A reflects light (mainly red light) from the dichroic mirror 240A toward the lens 260A, and the reflective mirror 250B reflects light (mainly blue light) from the dichroic mirror 240B toward the lens 260B. The lens 260A allows light (mainly red light) from the reflective mirror 250A to pass therethrough, and condenses the light to the dichroic mirror 270. The lens 260B allows light (mainly blue light) from the reflective mirror 250B to pass therethrough, and condenses the light to the dichroic mirror 270. The dichroic mirror 270 selectively reflects green light, and selectively allows light in a wavelength range other than the green light to pass therethrough. Herein, the dichroic mirror 270 allows a red light component of light from the lens 260A to pass therethrough. In a case where a green light component is included in the light from the lens 260A, the dichroic mirror 270 reflects the green light component toward the polarizing plate 280C. The polarizing plates 280A to 280C include a polarizer having a predetermined polarization axis. For example, in a case where conversion into P-polarized light is performed in the polarization conversion device 220, the polarizing plates 280A to 280C allow P-polarized light to pass therethrough, and reflect S-polarized light.

The image-forming unit 3 includes reflective polarizing plates 310A to 310C, reflective liquid crystal panels 320A to 320C, and a dichroic prism 330.

The reflective polarizing plates 310A to 310C respectively allow light having the same polarization axis (for example, P-polarized light) as the polarization axis of polarized light from the polarizing plates 280A to 280C to pass therethrough, and reflect light (S-polarized light) having any other polarization axis. Specifically, the reflective polarizing plate 310A allows P-polarized red light from the polarizing plate 280A to be transmitted toward a direction of the reflective liquid crystal panel 320A. The reflective polarizing plate 310B allows P-polarized blue light from the polarizing plate 280B to be transmitted toward a direction of the reflective liquid crystal panel 320C. The reflective polarizing plate 310C allows P-polarized green light from the polarizing plate 280C to be transmitted toward a direction of the reflective liquid crystal panel 320C. Moreover, P-polarized green light having passed through both the dichroic mirrors 240A and 240B to enter the reflective polarizing plate 310C passes through the reflective polarizing plate 310C as it is to enter the dichroic prism 330. Moreover, the reflective polarizing plate 310A reflects S-polarized red light from the reflective liquid crystal panel 320A to cause the S-polarized red light to enter the dichroic prism 330. The reflective polarizing plate 310B reflects S-polarized blue light from the reflective liquid crystal panel 320C to cause the S-polarized blue light to enter the dichroic prism 330. The reflective polarizing plate 310C reflects S-polarized green light from the reflective liquid crystal panel 320C to cause the S-polarized green light to enter the dichroic prism 330.

The reflective liquid crystal panels 320A to 320C respectively perform spatial modulation of red light, blue light, and green light.

The dichroic prism 330 synthesizes incident red light, incident blue light, and incident green light, and outputs synthesized light toward the projection optical system 4.

The projection optical system 4 includes lenses L410 to L450, and a mirror M400. The projection optical system 4 enlarges light outputted from the image-forming unit 3 and projects the enlarged light on a screen (not illustrated), etc. (Operations of Light Source Apparatus and Projector)

Next, description is given of an operation of the projector 100 including the light source apparatus 1 with reference to FIGS. 6 and 12.

First, in the light source apparatus 1, motors 14 and 70 are driven, and the phosphor wheel 10A and the diffuser 69 are rotated. Thereafter, each of the excitation light EL1 and the laser light EL2 that are blue light from the first laser group 62A and blue light from the second laser group 62B in the light source unit 62 is oscillated.

The excitation light EL1 is oscillated from the first laser group 62A, and passes through the lens 63, the dichroic mirror 67, and the lens 64 in order, and thereafter, is applied to the phosphor layer 12 of the phosphor wheel 10A. The phosphor layer 12 of the phosphor wheel 10A absorbs a portion of the excitation light EL1, and converts the portion into the fluorescence FL1 that is yellow light, and outputs the fluorescence FL1 toward the lens 64. The fluorescence FL1 is reflected by the dichroic mirror 67, and thereafter, passes through the lens 65 to be directed to the illumination optical system 2. On this occasion, the supporting base 11 of the phosphor wheel 10A reflects the remaining excitation light EL1 that is not absorbed by the phosphor layer 12 toward the lens 64. The excitation light EL1 reflected by the supporting base 11 of the phosphor wheel 10A is also reflected by the dichroic mirror 67, and thereafter passes through the lens 65 to be directed to the illumination optical system 2.

The laser light EL2 is oscillated from the second laser group 62B, and is applied to the diffuser 59 through the reflective mirror 68. The diffuser 69 diffuses and outputs the laser light EL2 toward the lens 66. The laser light EL2 passes through the dichroic mirror 67, and thereafter, passes through the lens 65 to be directed to the illumination optical system 2.

Thus, the light source apparatus 1 synthesizes the fluorescence FL (FL1) that is yellow light and the blue laser light EL (EL2) into white light, and causes the white light to enter the illumination optical system 2.

The white light from the light source apparatus 1 passes through the fly-eye lenses 210 (210A and 210B), the polarization conversion device 220, and the lens 230 in order, and thereafter reaches the dichroic mirrors 240A and 240B.

Mainly red light R is reflected by the dichroic mirror 240A, and the red light R passes through the reflective mirror 250A, the lens 260A, the dichroic mirror 270, the polarizing plate 280A, and the reflective polarizing plate 310A in order to reach the reflective liquid crystal panel 320A. The red light R is spatially modulated in the reflective liquid crystal panel 320A, and thereafter is reflected by the reflective polarizing plate 310A to enter the dichroic prism 330. It is to be noted that in a case where light reflected to the reflective mirror 250A by the dichroic mirror 240A includes a green light component, the green light component is reflected by the dichroic mirror 270, and passes through the polarizing plate 280C and the reflective polarizing plate 310C in order to reach the reflective liquid crystal panel 320C. In the dichroic mirror 240B, mainly blue light B is reflected, and enters the dichroic prism 330 through a similar process. Green light G having passed through the dichroic mirrors 240A and 240B also enters the dichroic prism 330.

The red light R, the blue light B, and the green light G having entered the dichroic prism 330 are synthesized into image light, and the image light is outputted to the projection optical system 4. The projection optical system 4 enlarges the image light from the image-forming unit 3, and projects the enlarged image light on a screen (not illustrated), etc.

Application Example 2

FIG. 13 illustrates an example of a configuration of the transmissive 3LCD projector 200 that performs light modulation by a transmissive liquid crystal panel (LCD). The projector 200 includes, for example, the light source apparatus 1 described in the foregoing first embodiment, an illumination optical system 5, an image-forming unit 6, and a projection optical system 7 in order.

The illumination optical system 5 includes, for example, an integrator device 530, a polarization conversion device 540, and a converging lens 550. The integrator device 530 includes a first fly-eye lens 531 and a second fly-eye lens 532. The first fly-eye lens 531 includes a plurality of microlenses arranged two-dimensionally, and the second fly-eye lens 532 includes a plurality of microlenses arranged to correspond one by one to the microlenses of the first fly-eye lens 531.

Light (parallel light) incident on the integrator device 530 from the light source apparatus 1 is divided into a plurality of light fluxes by the microlenses of the first fly-eye lens 531, and an image of each of the light fluxes is formed on a corresponding one of the microlenses of the second fly-eye lens 532. Each of the microlenses of the second fly-eye lens 532 serves as a secondary light source, and a plurality of parallel light beams having uniform luminance is applied as incident light to the polarization conversion device 540.

The integrator device 530 has a function of arranging incident light applied from the light source apparatus 1 to the polarization conversion device 40 in a uniform luminance distribution as a whole.

The polarization conversion device 540 has a function of aligning a polarization state of incident light incident thereon through the integrator device 530, etc. The polarization conversion device 540 outputs output light including the blue light B, the green light G, and the red light R through the lens 65, etc. disposed on an output side of the light source apparatus 1, for example.

The illumination optical system 5 further includes a dichroic mirror 560, a dichroic mirror 570, a mirror 580, a mirror 590, a mirror 600, a relay lens 610, a relay lens 620, a field lens 630R, a field lens 630G, a field lens 630B, liquid crystal panels 510R, 510G, and 510B as the image-forming unit 6, and a dichroic prism 640.

The dichroic mirror 560 and the dichroic mirror 570 have properties of selectively reflecting color light in a predetermined wavelength range, and allowing light in a wavelength range other than the predetermined wavelength range to pass therethrough. For example, the dichroic mirror 560 selectively reflects the red light R. The dichroic mirror 570 selectively reflects the green light G of the green light G and the blue light B that have passed through the dichroic mirror 560. The remaining blue light B passes through the dichroic mirror 570. Thus, light (white light Lw) emitted from the light source apparatus 1 is separated into a plurality of color light beams having different colors.

The separated red light R is reflected by the mirror 580, and becomes parallel through passing through the field lens 630R, and thereafter enters the light crystal panel 510R for red light modulation. The green light G becomes parallel through passing through the field lens 630G, and thereafter enters the liquid crystal panel 510G for green light modulation. The blue light B passes through the relay lens 610, and is reflected by the mirror 590, and further passes through the relay lens 620, and is reflected by the mirror 600. The blue light B reflected by the mirror 600 becomes parallel through passing through the field lens 630B, and thereafter enters the liquid crystal panel 510B for modulation of the blue light B.

The liquid crystal panels 510R, 510G, and 510B are electrically coupled to an unillustrated signal source (for example, a PC, etc.) that supplies an image signal including image information. The liquid crystal panels 510R, 510G, and 510B modulate incident light in each pixel on the basis of supplied image signals of respective colors to respectively generate a red image, a green image, and a blue image. Modulated light beams of respective colors (the formed images) enter the dichroic prism 640 to be synthesized. The dichroic prism 640 superposes the light beams of respective colors incident from three directions on one another to synthesize the light beams, and outputs the synthesized light beams to the projection optical system 7.

The projection optical system 7 includes a plurality of lenses 710, etc., and applies light synthesized by the dichroic prism 640 to an unillustrated screen. Thus, a full-color image is displayed.

7. Examples

As examples of the present disclosure, a relationship between an aspect ratio and a heat generator (phosphor)

temperature and a relationship between circumferential velocity of rotational movement of a rotator (a heat dissipation member) and a phosphor temperature were verified with use of the configuration descried in the foregoing first embodiment.

(Simulation 1)

Phosphor temperatures (° C.) at a circumferential rotation velocity of 3.12 (m/s) at an aspect ratio of 0.5 (the length of the fin 13a (fin length: A): 10 mm, a distance from the cylindrical surface S3 formed by the fin 13a to the cylindrical surface S4 of a housing 20 (an interval: B): 20 mm), an aspect ratio of 1 (A: 10 mm and B: 10 mm), an aspect ratio of 1.4 (A: 10 mm and B: 7 mm), an aspect ratio of 2 (A: 10 mm and B: 5 mm), an aspect ratio of 3 (A: 10 mm and B: 3.34 mm), an aspect ratio of 5 (A: 10 mm and B: 2 mm), and an aspect ratio of 10 (A: 10 mm and B: 1 mm) were verified with use of thermal fluid simulation software. FIG. 14 is a summary of results of such verification. FIG. 15A illustrates an example of a fluid flow between the heat dissipation member (the cylindrical surface S3 formed by the fin 13a) and the housing 20 (the cylindrical surface S4) at an aspect ratio within a range from 0 to less than 2. FIG. 15B illustrates an example of a fluid flow between the cylindrical surface S3 and the cylindrical surface S4 in an aspect ratio of 2 or more.

It was found from the results of the simulation 1 that a Taylor vortex was generated at an aspect ratio of 2 or more. Moreover, it was found that the phosphor temperature was significantly decreased with generation of the Taylor vortex.

(Simulation 2)

The circumferential velocity of rotational movement of the heat dissipation member was set to given values, and the phosphor temperature (° C.) at each circumferential rotation velocity was verified with use of thermal fluid simulation software. It is to be noted that the aspect ratio was 5. FIG. 16 is a summary of results of such verification. FIG. 17A illustrates an example of a fluid flow between the heat dissipation member (the cylindrical surface S3 formed by the fin 13a) and the housing 20 (the cylindrical surface S4) at a circumferential velocity of less than 3.12 (m/s). FIG. 17B illustrates an example of a fluid flow between the cylindrical surface S3 and the cylindrical surface S4 at a circumferential velocity of 3.12 (m/s) or more.

In general, a Taylor vortex is generated more easily as the circumferential velocity is faster. it was found from results of the simulation 2 that the Taylor vortex was generated at a circumferential velocity of 3.12 (ms) or more, and the phosphor temperature was significantly decreased, as compared with a velocity region in which the Taylor vortex was not generated.

Although the description has been given with reference to the first to fourth embodiments and the modification example, the present disclosure is not limited to the foregoing embodiments, etc., and may be modified in a variety of ways. For example, materials, etc. of respective members described in the foregoing embodiments, etc. are merely illustrative and non-limiting, and any other materials may be used.

Moreover, in the foregoing embodiments, etc., an example in which the phosphor layer 12 is formed by coating with a plurality of phosphor particles with use of the binder has been descried; however, the present disclosure is not limited thereto. For example, a counter substrate having light transmittance including, for example, quartz, glass, sapphire, crystal, polyethylene terephthalate (PET), etc. may be disposed at an interval on a side on which the surface S1 of a supporting base (for example, the supporting base 11) is located, and a phosphor layer (a so-called binderless phosphor layer) formed through filling a space between the supporting base and the counter substrate with phosphor particles may be provided. It is to be noted that it is preferable to dispose, between the supporting base and the counter substrate, a spacer that seals the phosphor particles between the supporting base and the counter substrate and keeps an interval between the supporting base and the counter substrate.

Further, in the foregoing embodiments, etc., a reflective phosphor wheel in which the fluorescence FL obtained by conversion in the phosphor layer 12 is reflected to a direction of application of the excitation light EL1 (on the side on which the surface S1 is located) has been described as an example; however, any of the foregoing embodiments, etc. is applicable to a transmissive phosphor wheel in which the fluorescence FL is transmitted to the side on which the surface S2 is located. It is to be noted that in a case where any of the foregoing embodiments, etc. is applied to the transmissive phosphor wheel, a heat dissipation member (for example, the heat dissipation member 13) is coupled to a supporting base (for example, the supporting base 11) while avoiding the light emission point X, or the heat dissipation member includes a member having light transmittance.

Furthermore, as the projection display apparatus according to the present disclosure, an apparatus other than the foregoing projector may be configured. In addition, the light source apparatus according to the present disclosure may be used for an apparatus other than the projection display apparatus. For example, the light source apparatus 1 according to the present disclosure may be used for illumination, and is applicable to a light source for a headlight of an automobile or a light source for illumination, for example.

It is to be noted that the present technology may have the following configurations.

(1)

A light source apparatus including:

a rotator including a light emission unit on one surface;

a heat dissipation member that is coupled to the rotator, and has a first cylindrical surface substantially parallel to a rotation axis of the rotator; and a housing that contains the rotator and the heat dissipation member, and has a second cylindrical surface substantially parallel to the first cylindrical surface of the heat dissipation member.

(2)

The light source apparatus according to (1), in which the first cylindrical surface serves as a rotation surface, and the second cylindrical surface serves as a fixed surface.

(3)

The light source apparatus according to (1) or (2), in which an aspect ratio (A/B) is 2 or more, where A represents a length in a direction parallel to the rotation axis of a portion formed through opposing the first cylindrical surface and the second cylindrical surface to each other, and B represents a distance from the first cylindrical surface to the second cylindrical surface.

(4)

The light source apparatus according to any one of (1) to (3), in which circumferential velocity of rotational movement of the first cylindrical surface is 3.12 m/s or more.

(5)

The light source apparatus according to any one of (1) to (4), in which the heat dissipation member is provided on another surface opposite to the one surface of the rotator.

(6)

The light source apparatus according to any one of (1) to (5), in which the heat dissipation member and the housing respectively have a plurality of the first cylindrical surfaces and a plurality of the second cylindrical surfaces that are opposed to each other and paired with each other.

(7)

The light source apparatus according to (6), in which the plurality of the first cylindrical surfaces are disposed concentrically about the rotation axis of the rotator as a center, and the plurality of the first cylindrical surfaces is disposed more tightly in a region in proximity to the light emission unit than a region other than the region in proximity to the light emission unit.

(8)

The light source apparatus according to any one of (1) to (7), in which the housing includes an external heat dissipation structure.

(9)

The light source apparatus according to any one of (1) to (8), in which the housing is coupled to a liquid cooling system.

(10)

The light source apparatus according to any one of (1) to (9), in which the housing has a sealed structure.

(11)

The light source apparatus according to any one of (1) to (10), in which a gas having larger heat conductivity than heat conductivity of 0.0257 W/mK in an environment at 20° C. is contained inside the housing.

(12)

The light source apparatus according to any one of (1) to (11), in which a liquid is sealed inside the housing.

(13)

The light source apparatus according to any one of (1) to (12), in which the rotator includes a disk-shaped substrate, and a light-emitting layer including the light emission unit is formed on the substrate in an annular shape.

(14)

A projection display apparatus including:

a light source apparatus;

an image generation optical system that modulates light from the light source apparatus on the basis of an inputted image signal to generate image light; and a projection optical system that projects the image light generated in the image generation optical system, the light source apparatus including:

a rotator including a light emission unit on one surface, a heat dissipation member that is coupled to the rotator, and has a first cylindrical surface substantially parallel to a rotation axis of the rotator, and a housing that contains the rotator and the heat dissipation member, and has a second cylindrical surface substantially parallel to the first cylindrical surface of the heat dissipation member.

This application claims the benefit of Japanese priority Patent Application JP2016-245705 filed with the Japan Patent Office on Dec. 19, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light source apparatus comprising:

a rotator including a light emission unit on one surface;

a heat dissipation member that is coupled to the rotator and has a first cylindrical surface substantially parallel to a rotation axis of the rotator; and a housing that contains the rotator and the heat dissipation member, and has a second cylindrical surface substantially parallel to the first cylindrical surface of the heat dissipation member, wherein the heat dissipation member and the housing respectively have a plurality of the first cylindrical surfaces and a plurality of the second cylindrical surfaces that are opposed to each other and paired with each other and wherein the plurality of the first cylindrical surfaces are disposed concentrically about the rotation axis of the rotator as a center, and the plurality of the first cylindrical surfaces is disposed more tightly in a region in proximity to the light emission unit than a region other than the region in proximity to the light emission unit.

2. The light source apparatus according to claim 1, wherein the first cylindrical surface serves as a rotation surface, and the second cylindrical surface serves as a fixed surface.

3. The light source apparatus according to claim 1, wherein circumferential velocity of rotational movement of the first cylindrical surface is 3.12 m/s or more.

4. The light source apparatus according to claim 1, wherein the heat dissipation member is provided on another surface opposite to the one surface of the rotator.

5. The light source apparatus according to claim 1, wherein the housing includes an external heat dissipation structure.

6. The light source apparatus according to claim 1, wherein the housing has a sealed structure.

7. The light source apparatus according to claim 1, wherein a gas having larger heat conductivity than heat conductivity of 0.0257 W/mK in an environment at 20° C. is contained inside the housing.

8. The light source apparatus according to claim 1, wherein the rotator includes a disk-shaped substrate, and a light-emitting layer including the light emission unit is formed on the substrate in an annular shape.

9. A light source apparatus comprising:

a rotator including a light emission unit on one surface;

a heat dissipation member that is coupled to the rotator and has a first cylindrical surface substantially parallel to a rotation axis of the rotator; and a housing that contains the rotator and the heat dissipation member, and has a second cylindrical surface substantially parallel to the first cylindrical surface of the heat dissipation member, wherein the housing is coupled to a liquid cooling system.

10. A light source apparatus comprising:

a rotator including a light emission unit on one surface;

a heat dissipation member that is coupled to the rotator and has a first cylindrical surface substantially parallel to a rotation axis of the rotator; and a housing that contains the rotator and the heat dissipation member, and has a second cylindrical surface substantially parallel to the first cylindrical surface of the heat dissipation member, wherein a liquid is sealed inside the housing.

11. A projection display apparatus comprising:
a light source apparatus;
an image generation optical system that modulates light from the light source apparatus on a basis of an inputted image signal to generate image light; and
a projection optical system that projects the image light generated in the image generation optical system,
the light source apparatus including:
a rotator including a light emission unit on one surface,
a heat dissipation member that is coupled to the rotator and has a first cylindrical surface substantially parallel to a rotation axis of the rotator, and
a housing that contains the rotator and the heat dissipation member, and has a second cylindrical surface substantially parallel to the first cylindrical surface of the heat dissipation member, wherein the heat dissipation member and the housing respectively have a plurality of the first cylindrical surfaces and a plurality of the second cylindrical surfaces that are opposed to each other and paired with each other and wherein
the plurality of the first cylindrical surfaces are disposed concentrically about the rotation axis of the rotator as a center, and
the plurality of the first cylindrical surfaces is disposed more tightly in a region in proximity to the light emission unit than a region other than the region in proximity to the light emission unit.

* * * * *